(12) United States Patent
Hitotsui

(10) Patent No.: US 7,080,233 B2
(45) Date of Patent: *Jul. 18, 2006

(54) RECORDING/PLAYBACK APPARATUS AND EDITING METHOD

(75) Inventor: Yoshihiko Hitotsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/081,595

(22) Filed: Mar. 17, 2005

(65) Prior Publication Data

US 2005/0157601 A1    Jul. 21, 2005

Related U.S. Application Data

(63) Continuation of application No. 09/905,873, filed on Jul. 17, 2001, now Pat. No. 6,915,377.

(30) Foreign Application Priority Data

Jul. 25, 2000  (JP) .............................. 2000-229047

(51) Int. Cl.
*G06F 13/00* (2006.01)
*H04N 5/85* (2006.01)
*G11B 27/00* (2006.01)

(52) U.S. Cl. ...................... 711/712; 707/102; 386/126; 369/30.05

(58) Field of Classification Search ............. 369/30.05, 369/83, 84; 386/106, 126; 711/712; 707/102; G11B 27/00; H04N 5/85; G06F 13/00, 7/00

See application file for complete search history.

(56) References Cited

U.S. PATENT DOCUMENTS

| | | | |
|---|---|---|---|
| 3,718,906 A | 2/1973 | Lightner | |
| 4,141,045 A | 2/1979 | Sheehan | |
| 4,905,185 A | 2/1990 | Sakai | |
| 5,041,921 A | 8/1991 | Sheffler | |
| 5,218,672 A | 6/1993 | Morgan et al. | |
| 5,303,218 A | 4/1994 | Miyake | |
| 5,418,654 A | 5/1995 | Scheffer | |
| 5,638,346 A | 6/1997 | Aramaki | |
| 5,737,639 A | 4/1998 | Ohmori | |
| 5,818,435 A | 10/1998 | Kozuka et al. | |
| 5,889,747 A | 3/1999 | Hisamatsu et al. | |

(Continued)

FOREIGN PATENT DOCUMENTS

EP    0 613 144    8/1994

(Continued)

OTHER PUBLICATIONS

MS-DOS 6, Special Edition, Copyright (c) 1993, p. 949-MOVE.

*Primary Examiner*—A M Psitos
(74) *Attorney, Agent, or Firm*—Oblon, Spivak, McClelland, Maier & Neustadt, P.C.

(57) ABSTRACT

A recording/playback apparatus is characterized in that management information for managing data recorded on a recording medium is provided in a format allowing tracks to be bundled into groups and managed in group units in addition to management of the data in track units. By referring to this management information, tracks from a source can be grouped automatically during a variety of recording and playback operations including mainly a search for the beginning of each group, and various kinds of editing work can be done in group units. The recording/playback apparatus is capable of carrying edit processing such as concatenation, division, batch deletion and a move operation on a specified group recorded on a disc used for recording groups each consisting of a plurality of programs.

13 Claims, 20 Drawing Sheets

U.S. PATENT DOCUMENTS

| | | |
|---|---|---|
| 5,953,008 A | 9/1999 | Hagiuda |
| 5,990,406 A | 11/1999 | Nakamura et al. |
| 5,995,471 A | 11/1999 | Saoyama et al. |
| 6,011,758 A | 1/2000 | Dockes et al. |
| 6,118,924 A | 9/2000 | Nakatani et al. |
| 6,181,870 B1 | 1/2001 | Okada et al. |
| 6,188,662 B1 | 2/2001 | Maeda et al. |
| 6,272,082 B1 | 8/2001 | Ishii et al. |
| 6,542,445 B1 | 4/2003 | Ijichi et al. |
| 6,560,403 B1 | 5/2003 | Tanaka et al. |
| 6,567,349 B1 | 5/2003 | Nagata et al. |
| 6,567,983 B1 | 5/2003 | Shiimori |

FOREIGN PATENT DOCUMENTS

| | | |
|---|---|---|
| EP | 0697699 | 2/1996 |
| EP | 0 915 469 | 5/1999 |
| EP | 1 003 173 | 5/2000 |
| JP | 56-92638 | 7/1981 |
| JP | 10-336579 | 12/1998 |
| JP | 2000-215648 | 8/2000 |
| WO | WO 01/16953 | 3/2001 |

FIG. 3

| | MD-DATA2 | MD-DATA1 |
|---|---|---|
| TRACK PITCH | 0.95 μm | 1.6 μm |
| PIT LENGTH | 0.39 μm/bits | 0.59 μm/bits |
| λ·NA | 650nm·0.52 | 780nm·0.45 |
| RECORDING TECHNIQUE | LAND RECORDING | GROOVE RECORDING |
| ADDRESSING TECHNIQUE | INTERLACE ADDRESSING (DOUBLE SPIRALS ONE-SIDE WOBBLE) | SINGLE-SPIRAL TWO-SIDE WOBBLES |
| MODULATION TECHNIQUE | PLL(1,7) | EFM |
| ERROR CORRECTION TECHNIQUE | RS-PC | ACIRC |
| INTERLEAVING | CLOSED BLOCK | CONVOLUTION |
| REDUNDANCY | 19.7% | 46.3% |
| LINEAR VELOCITY | 2.0m/s | 1.2m/s |
| DATA RATE | 589kB/s | 133kB/s |
| RECORDING CAPACITY | 650MB | 140MB |

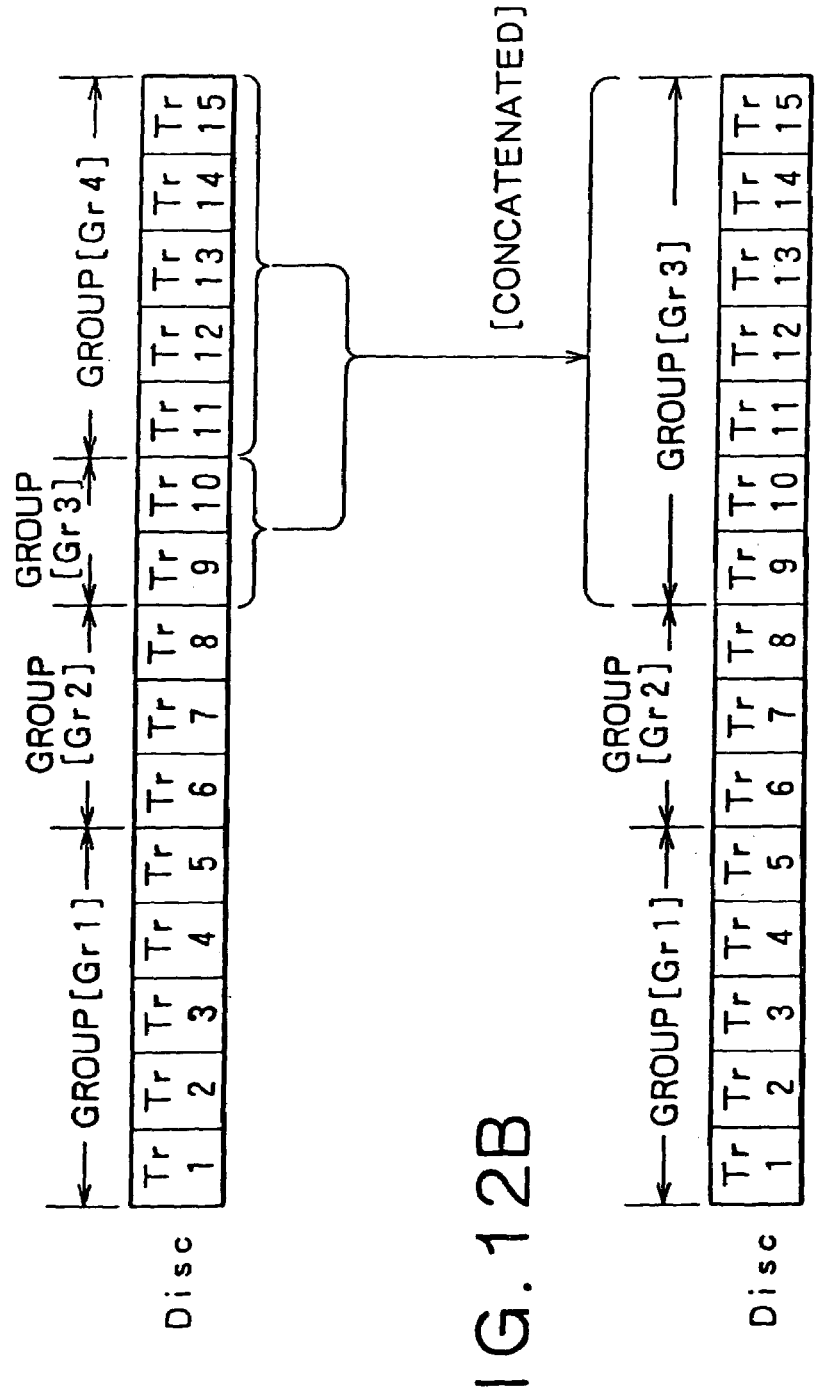

FIG. 13A — Disc (MD): GROUP[Gr1] containing Tr1, Tr2, Tr3, Tr4, Tr5

FIG. 13B — CD: Tr1, Tr2, Tr3, Tr4, Tr5, Tr6, Tr7 [DUBBING RECORDING]

FIG. 13C — Disc (MD): GROUP[Gr1] containing Tr1–Tr5; GROUP[Gr2] containing Tr6–Tr12

TOC#0

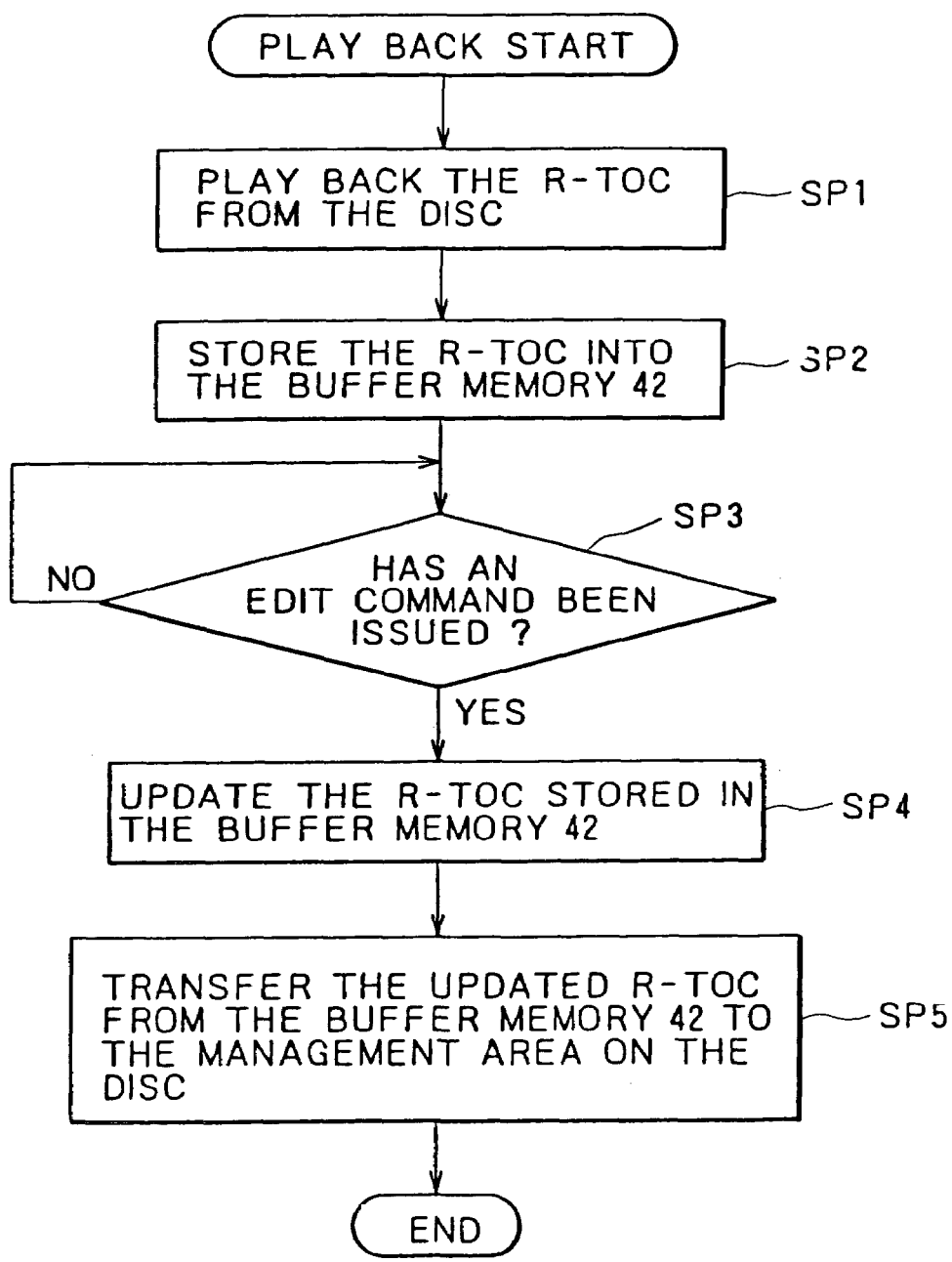

RECORDING/PLAYBACK APPARATUS AND EDITING METHOD

CROSS-REFERENCE TO RELATED APPLICATIONS

This application is a continuation application of Ser. No. 09/905,873, filed Jul. 17, 2001 now U.S. Pat. No. 6,915,377, now allowed, and claims priority to Japanese application No. 2000-229047, filed Jul. 25, 2000. The entire contents of both of the above-identified applications are incorporated herein by reference.

BACKGROUND OF THE INVENTION

The present invention relates to a recording/playback apparatus and an editing method, which are used for editing groups recorded on a disc for recording groups each consisting of a plurality of programs.

In recent years, media that can be used for recording various kinds of AV (audio and video) data and allows the data to be played back has been becoming popular in a wide range of applications.

In addition, also in recent years, promotion to increase the storage capacity of various kinds of media has been going on. Thus, the size of data that can be recorded in a medium can now be increased. Furthermore, with progress made in technologies for compression of data, the storage capacity of a recording medium can also be increased.

By the way, in accordance with a format of ordinary digital audio data used in a conventional apparatus, recorded data is managed in units each referred to as a program. That is to say, in the case of audio data, for example, a program normally represents a piece of music. Thus, recorded data is managed in musical units.

Typical digital audio equipment for handling such audio data includes a mini-disc recording/playback apparatus used in conjunction with an magneto-optical disc serving as a recording medium.

In the case of a mini disc, for example, management information referred to as a user TOC (Table of Contents) abbreviated hereafter to a U-TOC is recorded on the mini disc separately from main data such as musical data. The U-TOC is used for managing already-recorded-data areas and recordable-data free areas. An already-recorded-data area is an area already used by the user for recording main data, and a recordable-data free area is an area in which no data has been recorded. A recording apparatus identifies a recordable-data free area for recording data while a playback apparatus identifies an already-recorded-data area from which data is to be played back.

Every recorded piece of music is managed by using the U-TOC in data units each referred to as a track. The U-TOC includes start and end addresses of each piece of music. Free areas in which no data is not recorded yet are each treated as a recordable-data area, start and end addresses of which, are also cataloged in the U-TOC.

In addition, by managing areas on the disc through the use of such a U-TOC, various kinds of processing can be carried out with ease and at a high speed by merely updating and rewriting information stored in the U-TOC. Examples of the processing are division of a track used as a unit of recorded data such as musical data, combination of tracks, moving of a track (or changing the number of a track) and erasure of a track.

Furthermore, the U-TOC includes an area for recording the title of the disc (or the name of the disc) and a music name (or the name of a track) of each recorded program such as a piece of music as character information. Thus, the user is capable of doing editing work such as work to enter the name of the disc or the name of a track by carrying out an operation.

It should be noted that, in this specification, the technical term 'program' is used to imply a unit of typically audio data such as musical data which is recorded on the disc as main data. The technical term 'track' may be used to mean the same thing as the program.

In accordance with the format of the conventional mini-disc system, the data recording capacity is 140 MB. Such a capacity can be used for recording compressed audio data completing an encoding process based on an audio-data compression technique known as ATRAC (Adaptive Transform Acoustic Coding). This data recording capacity of a mini disc for recording such audio data corresponds to a playback time of about 74 minutes.

Then, in recent years, a new format of the mini disc has been developed to achieve a very high recording capacity. In accordance with this new format, by prescribing a disc format and a data format separately, for example, a data recording capacity of 650 MB can be realized. Such a capacity can be used for recording compressed audio data completing an encoding process based on, for example, another audio-data compression technique known as ATRAC2. The ATRAC2 compression technique is a compression technique with a data compression rate higher than its predecessor, namely, ATRAC. This data recording capacity of a mini disc for recording ATRAC2-compressed audio data corresponds to a playback time of about 10 hours.

To put it in more detail, the mini disc with a data recording capacity of 140 MB can be normally used for recording 10 to 20 pieces of music, that is, the number of tracks or the number of musical pieces that can be recorded on such a mini disc is in the range of 10 to 20. In other words, the mini disc can be used for recording about as many tracks as those of the so-called album.

With the data recording capacity of a mini disc increased to 650 MB to give a higher disc recording density and with progress in technology of compressing audio data, the number of tracks or the number of musical pieces that can be recorded on such a mini disc rises. For example, a playback time of about 10 hours can thus be realized as described above. If the playback time of a piece of music is about 4 minutes, for example, about 150 pieces of music can be recorded. By assuming that a playback time of a CD is 74 minutes, a mini disc with a data recording capacity of 650 MB can be used for recording pieces of music recorded on about 8 CDs.

Consider for example that the data recording capacity of a mini disc has been increased to allow more tracks to be recorded thereon as described above. In this case, the user may desire that a number of tracks recorded on such a mini disc be managed in groups which are each typically an album or a unit based on another arbitrary concept.

If the method of management by track units using the conventional U-TOC described earlier is adopted, however, it will be impossible to implement segmentation management by group units cited above as processing carried out by an apparatus. For this reason, in order to manage numerous pieces of music in group units, the user must record the name of each piece of music on typically a label or must remember the track names. As a result, the management of the tracks unavoidably becomes cumbersome and improper.

In addition, a group obtained as a result of the track classification done by the user as described above cannot be selected fast from numerous pieces of music or a number of tracks recorded on the disc. As a solution to this problem, there has been developed an apparatus whereby the beginning of a predetermined number of tracks such as 10 tracks or 10 pieces of music is detected. In the case of such an apparatus, however, the beginning of a group obtained as a result of the track classification done by the user cannot be detected. Thus, the apparatus cannot be said to be an apparatus offering an effective solution to the problem.

Furthermore, if the user desires to carry out a variety of editing works described above in group units, the editing operations will be extremely complicated and troublesome due to the fact that operations to carry out the editing work are performed in track units.

SUMMARY OF THE INVENTION

In view of the foregoing, the present invention has been made, and an object of the present invention is to provide a capability of carrying out a playback operation and editing work in group units more easily than the conventional ones by managing a plurality of tracks recorded typically on a recording medium hierarchically in group units.

In accordance with an aspect of the present invention, there is provided a recording/playback apparatus for recording data onto a recording medium comprising a program area for recording one or more programs and management area for recording management information used for managing numbers of the programs in group units each obtained as a result of grouping predetermined ones selected from the programs recorded in said program area, said recording/playback apparatus including playback means for playing back the management information from the management area on the recording medium; storage means for storing the management information played back by the playback means; operation means for issuing an editing command for any one of the group units each obtained as a result of grouping predetermined ones selected from the programs; updating means for updating the management information stored in the storage means in accordance with the editing command issued by the operation means; and recording means for recording the management information updated by the updating means into the management area on the recording medium.

In accordance with another aspect of the present invention, there is provided an editing method for editing data recorded on a recording medium comprising a program area for recording one or more programs and management area for recording management information used for managing numbers of the programs in group units each obtained as a result of grouping predetermined ones selected from the programs recorded in the program area, the editing method including a playback step of playing back said management information from the management area on the recording medium; a storage step of storing the management information played back at the playback step; a judgment step of forming a judgment as to whether or not an editing command has been issued for any one of the group units each obtained as a result of grouping predetermined ones selected from the programs; an updating step of updating the management information stored at the storage step in case an outcome of the judgment formed at the judgment step indicates that an editing command has been issued for any one of the group units; and a recording step of recording the management information updated at the updating step into the management area on the recording medium.

In accordance with the present invention described above, management information used for managing data recorded on a recording medium allows the recorded data to be managed in bundled units, namely, track (program) units or group (program-set) units. By referring to the management information, a variety of playback operations can be carried out in group units.

In a circumstance where an extremely large number of tracks is recorded on a recording medium with a large storage capacity, for example, there is naturally raised a demand to put a plurality of tracks in a group and carry out a variety of playback operations in group units. In accordance with the conventional technique of data management, however, the management information allows management of data to be executed in track units only. Thus, it was difficult to implement management of data in group units. In consequence, an operation to play back data in group units could not be carried out.

In accordance with the present invention, on the other hand, there is provided management information allowing recorded data to be managed in group units where a group is a plurality of tracks as described above. Thus, by referring to the management information, various kinds of playback control processing can be carried out in group units.

An example of the playback control processing is an operation to search for the beginning of a group. This processing allows the user to play back data from the disc by selecting a desired group without carrying out a complicated operation which is needed in the conventional system.

In addition, the management information allows for group-free tracks each pertaining to no group. Thus, group-free tracks can be managed individually. It is desirable to provide a function for deliberately setting a track as a track pertaining to no group in some cases so as to allow the user to use tracks as the user wishes. By allowing a track to be managed as a group-free track in this way, it is possible to keep up with demands raised by the user as described above. As a result, the user is provided with more convenience.

In accordance with the present invention, a track newly recorded in a recording operation can be included in an existing group so that the track can be managed as the group.

Thus, the user is capable of managing a newly recorded track properly as if the track existed in a group from the beginning without taking the trouble to carry out editing work to put the newly recorded track in a group.

In one implementation of the group management in such a recording operation, a newly recorded track is managed by being included in a new group. In accordance with another implementation, a newly recorded track is managed by being included in a specific group set before for already recorded data. Typically, the user is also allowed to select a desired one of the implementations of the recording management. As a result, the user is provided with more convenience.

In addition, in this embodiment, when a so-called album comprising one or more tracks is recorded onto a recording medium, the tracks composing the album are recorded by being managed as a group. Thus, when a CD is used as a source in a dubbing operation, for example, data dubbed from the CD is managed automatically as if the data were a group. Also in this respect, the user is provided with more convenience. In particular, actually, there is considered a relatively large number of cases in which a newly set group is originated from an album. Thus, such a function is extremely useful for practical use.

Furthermore, a track newly recorded in a recording operation can also be managed by being treated as a group-free track. Thus, this function also keeps up with the user's demand for a feature of deliberately including a newly recorded track in none of the existing groups.

Moreover, in accordance with the present invention, it is possible to update management information having a format allowing management of recorded data in group units to be executed. Thus, various kinds of editing work can be done in group units in accordance with operations carried out by the user as edit processing.

If editing work supposed to be done in group units is carried out on the basis of management information allowing management of recorded data to be executed in track units, for example, the user must perform the same operation repeatedly for all tracks pertaining to a group being edited. These operations are troublesome as well as cumbersome. The present invention is capable of solving this problem by making the operations extremely simple and easy to do.

BRIEF DESCRIPTION OF THE DRAWINGS

FIG. 3 is a table showing comparisons of physical characteristics of a disc having a low recording density conforming to MD-DATA1 with physical characteristics of a disc having a high recording density conforming to MD-DATA2;

FIG. 12A is an explanatory diagram showing a model of a disc for recording grouped programs in an initial state;

FIG. 12B is an explanatory diagram showing a model of the disc shown in FIG. 12A after an operation to concatenate groups 3 and 4 to form a single group in a group recording mode;

FIG. 13A is an explanatory diagram showing a model of an MD (mini disc) with group 1 already recorded thereon;

FIG. 13B is an explanatory diagram showing a model of a CD (compact disc) serving as a source to be dubbed to the MD shown in FIG. 13A;

FIG. 13C is an explanatory diagram showing a model of the MD after the dubbing operation;

FIG. 21 is a flowchart representing the procedure of an editing method provided by the present invention.

DETAILED DESCRIPTION OF THE PREFERRED EMBODIMENT

Hereinafter, a preferred embodiment of the present invention is described. The embodiment implements a recording/playback apparatus capable of recording data into and playing back data from a magneto-optical disc serving as a mini disc.

The embodiment is described in the following order.
1: Disc Format
2: Recording/Playback Apparatus
3: Operation Unit
4: Track Management
5: Search for the Beginning in a Group recording mode
6: Recording Operation
   6-1: Group recording mode
   6-2: Track recording mode
7: Typical Editing in the Group recording mode
   7-1: Moving
   7-2: Concatenation
   7-3: Dubbing Recording 8: Protected-Security Group
9: Typical TOC Structure
   9-1: Disc Data Structure
   9-2: TOC #0
   9-3: TOC #1
   9-4: TOC #2
   9-5: TOC #3
1: Disc Format The recording/playback apparatus implemented by this embodiment conforms to a format that is called MD data and used for recording and playing back data onto and from a magneto-optical disc serving as a mini disc. As MD data formats, there have been developed two kinds of format, namely, MD-DATA1 and MD-DATA2. The recording/playback apparatus implemented by this embodiment records and plays back data onto and from a magneto-optical disc in conformity with the MD-DATA2 format which allows data to be recorded at a recording density higher than the MD-DATA1 format. For this reason, first of all, the MD-DATA2 format is described.

It should be noted that, with the MD-DATA2 format, various kinds of data other than audio data can also be recorded and played back onto and from a disc. In order to make the description simple, however, it is assumed in the following description that the recording/playback apparatus implemented by this embodiment records and plays back only audio data onto and from a disc.

Figure 1:
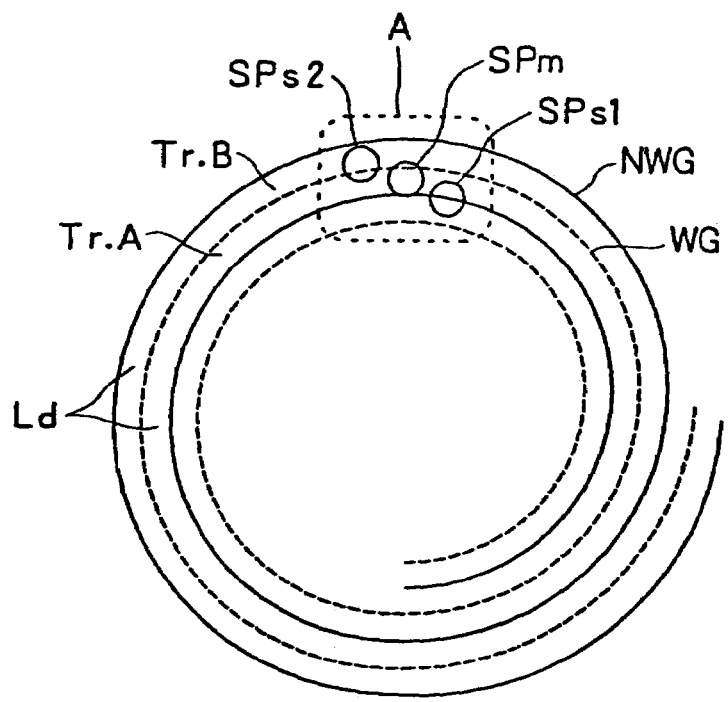
FIG. 1 is an explanatory diagram showing a model of a disc of a one-side wobble type.
Figures 2A, 2B:
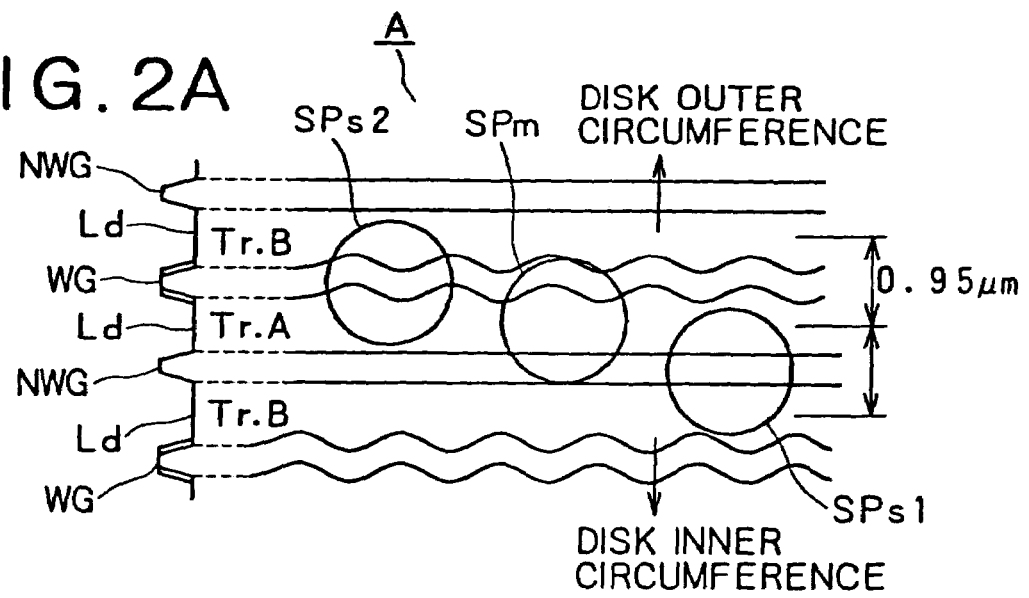
FIG. 2A is an explanatory diagram showing a cross section of lands and grooves on the disc.
FIG. 2B is an explanatory diagram showing wobbled grooves and flat grooves alternately formed on the disc.

FIGS. 1, 2A and 2B are diagrams each conceptually showing a typical track structure of a disc conforming to the MD-DATA2 format. FIGS. 2A and 2B are diagrams showing respectively an enlarged cross section and an enlarged top view of a portion enclosed by a dashed line A shown in FIG. 1.

As shown in these figures, two kinds of groove are created in advance on the surface of the disc. The two kinds of groove are a wobbled groove WG including wobbles and a non-wobbled groove NWG including no wobbles. Then, a land Ld is created between the wobbled groove WG and the non-wobbled groove NWG to give a double-spiral shape on the disc.

In accordance with the MD-DATA2 format, the land Ld is used as a recording track. Since the wobbled groove WG and the non-wobbled groove NWG are created as described above, however, double-spiral recording tracks are formed. The double-spiral recording tracks are two independent tracks Tr.A and Tr.B.

The track Tr.A is a track sandwiched by the wobbled groove WG on the outer-circumference side of the disc and the non-wobbled groove NWG on the inner-circumference side of the disc.

On the other hand, the track Tr.B is a track sandwiched by the wobbled groove WG on the inner-circumference side of the disc and the non-wobbled groove NWG on the outer-circumference side of the disc.

That is to say, the track Tr.A can be regarded as a track wobbled only on the outer-circumference side of the disc while the track Tr.B can be regarded as a track wobbled only on the inner-circumference side of the disc.

In such a configuration, a track pitch is defined as a distance between the center of a track Tr.A and the center of a track Tr.B adjacent to the track Tr.A. As shown in FIG. 2B, the track pitch is 0.95 micrometers.

In the configuration described above, wobbles created on a groove serving as a wobbled groove WG are created by using a signal obtained as a result of FM (Frequency Modulation) and bi-phase modulation, which are based on physical addresses on the disc. Thus, a physical address on the disc can be obtained by demodulation of information acquired as a result of processing to play back a wobbling state of a wobbled groove WG during a playback operation.

In addition, address information included in a wobbled groove WG is information applicable and common to the tracks Tr.A and Tr.B. That is to say, the tracks Tr.A and Tr.B sandwiching a wobbled groove WG on the inner-circumference and outer-circumference sides respectively share information on addresses represented by a wobbling state of the wobbled groove WG.

It should be noted that such an addressing technique is also known as an interlace addressing technique. By adoption of this interlace addressing technique, it is possible to suppress the amount of cross-talk between wobbles adjacent to each other and to reduce the track pitch. A technique whereby addresses are recorded by creation of wobbles on a groove is referred to as an ADIP (Address In Pregroove) technique.

The tracks Tr.A and Tr.B sharing common information on addresses as described above can be distinguished from each other as follows.

Consider as an example that a three-beam technique is adopted. A main beam of the three beams is used for tracing a land Ld. In this state, the remaining two side beams are used for tracing grooves on both sides of the track being traced by the main beam.

As an example, FIG. 2B shows a state in which a main-beam spot SPm is tracing a track Tr. A. Spots SPs1 and SPs2 are spots of the side beams. In this state, the side-beam spot SPs1 is tracing a non-wobbled groove NWG on the inner-circumference side while the side-beam spot SPs2 is tracing a wobbled groove WG on the outer-circumference side.

While a main-beam spot SPm is tracing a track Tr. B as shown in none of the figures, on the other hand, the side-beam spot SPs2 is tracing a non-wobbled groove NWG whereas the side-beam spot SPs1 is tracing a wobbled groove WG.

In this way, when a track traced by the main-beam spot SPm is switched from a track Tr.A to a track Tr.B, the non-wobbled groove NWG and the wobbled-groove WG traced by the side-beam spots SPs1 and SPs2 respectively are naturally swapped with each other.

The waveform of a detection signal obtained in a photo detector as a result of reflection of the side-beam spot SPs1 on the wobbled groove WG is different from the waveform of a detection signal obtained in the photo detector as a result of reflection of the side-beam spot SPs1 on the non-wobbled groove NWG. By the same token, the waveform of a detection signal obtained in a photo detector as a result of reflection of the side-beam spot SPs2 on the wobbled groove WG is different from the waveform of a detection signal obtained in the photo detector as a result of reflection of the side-beam spot SPs2 on the non-wobbled groove NWG. It is thus possible to form a judgment as to whether the side-beam spot SPs1 or SPs2 is tracing the wobbled groove WG or to form a judgment as to whether the side-beam spot SPs1 or SPs2 is tracing the non-wobbled groove NWG. As a result, it is possible to form a judgment as to whether the track Tr.A or Tr.B is being traced by the main beam.

FIG. 3 is a table showing comparison of main specifications of the MD-DATA2 format for the track structure like the one described above with-those of the MD-DATA1 format.

First of all, in the case of the MD-DATA1 format, the track pitch is 1.6 micrometers, the pit length is 0.59 micrometers per bit, the laser wavelength λ is 780 nm and the numerical aperture NA of the optical head is 0.45.

The groove recording technique is adopted as a recording method. With this recording technique, a groove is used as a track for recording data and a track from which recorded data is played back.

As an addressing method, there is adopted a technique using a wobbled groove. In accordance with this technique, a groove with a single-spiral shape is created and wobbles representing information on addresses are formed on both sides of the groove to give the wobbled groove.

As a technique of modulating data to be recorded, an EFM (8–14 modulation) method is adopted. As an error correction technique, an ACIRC (Advanced Cross Interleave Reed-Solomon Code) method is adopted. In accordance with this error correction technique, convolution is implemented for data interleaving. For this reason, the data redundancy is 46.3%.

In accordance with the MD-DATA1 format, a CLV (Constant Linear Velocity) method is adopted as a technique for driving the disc. The linear speed of the CLV technique is 1.2 m/s.

The standard data rate for recording and playback operations is 133 kB/s and the recording capacity is 140 MB.

In the case of the MD-DATA2 format, on the other hand, the track pitch is 0.95 micrometers, and the pit length is 0.39 micrometers per bit. The track pitch and the pit length are obviously smaller than those of the MD-DATA1 format. In order to realize this pit length, the laser wavelength λ is set at 650 nm and the numerical aperture NA of the optical head is set at 0.52. The diameter of the beam spot is squeezed at the focal position and the band of the optical system is widened.

As a recording technique, the land recording method is adopted as has been described earlier by referring to FIGS. 1, 2A and 2B. As an addressing technique, the interlace addressing method is adopted. As a technique for modulating data to be recorded, an RLL (1, 7) method suitable for high-density recording is adopted. It should be noted that RLL is an abbreviation of Run Length Limited. As a technique for correcting an error, an RS(Reed Solomon)-PC (Product Code) method is adopted. As a data-interleave technique, a closed-block method is adopted. As a result of adoption of the techniques cited above, the data redundancy can be suppressed to 19.7%.

Also in accordance with the MD-DATA2 format, a CLV (Constant Linear Velocity) method is adopted as a technique for driving the disc. In this case, however, the linear speed of the CLV technique is set at 2.0 m/s. The standard data rate for recording and playback operations is 589 kB/s and the recording capacity is 650 MB. It is thus possible to implement a high recording density equal to 4 times the recording density of the MD-DATA1 format.

In an operation to record a moving picture conforming to the MD-DATA2 format for which the data of the moving picture has been compressed and encoded in accordance with the MPEG2 technique, the moving picture being recorded can have a playback time in the range of 15 to 17 minutes in dependence on the pit rate of the encoded data. In an operation to record an audio-signal data which has been compressed in accordance with the ATRAC2 (Adaptive Transform Acoustic Coding 2) technique, the data of the audio signal being recorded can have a playback time of about ten hours.

2: Recording/Playback Apparatus

Figure 4:
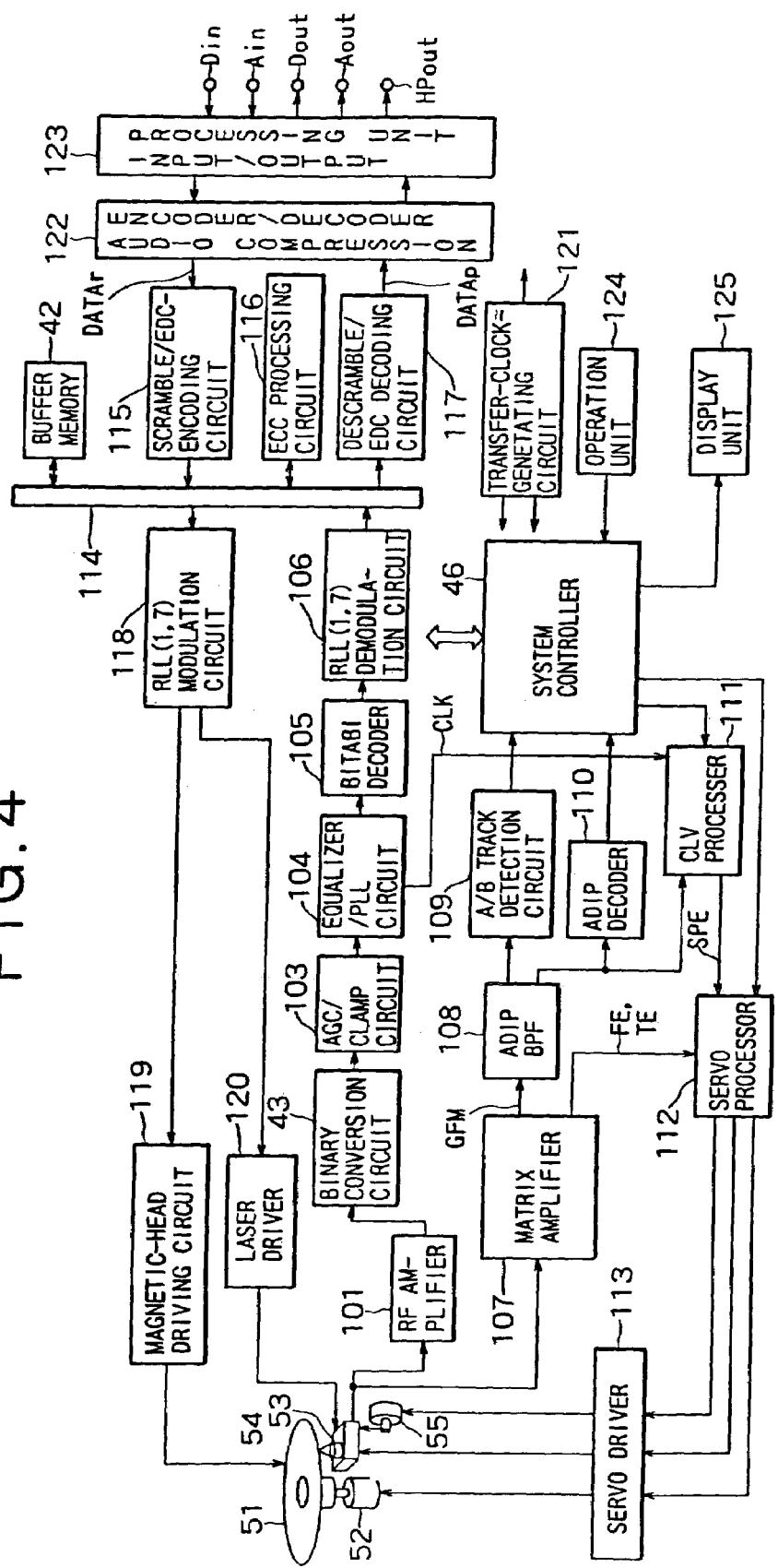
FIG. 4 is a block diagram showing a typical configuration of a recording/playback apparatus according to the present invention for a magneto-optical disc.

The following describes a typical configuration of a recording/playback apparatus implemented by this embodiment to conform to the MD-DATA2 format described earlier by referring to a block diagram of FIG. 4.

Information detected in an operation carried out by an optical head 53 to read out data from a disc 51 is supplied to an RF amplifier 101 employed in an RF-signal-processing circuit (not shown). The information is represented by an optical current obtained by a photo detector as a result of detection of a reflected laser beam.

The RF amplifier 101 generates a playback RF signal as a playback signal from the detected information received from the optical head 53, and supplies the playback signal to a binary conversion circuit 43. The binary conversion circuit 43 carries out binary conversion on the playback RF signal received from the RF amplifier 101 to generate a digital playback RF signal or a binary-converted RF signal.

First of all, this binary-converted RF signal is supplied to an AGC/clamp circuit 103 for carrying out processes such as gain adjustment and clamp processing. A signal produced by the AGC/clamp circuit 103 is then supplied to an equalizer/PLL circuit 104.

The equalizer/PLL circuit 104 carries out an equalizing process on the binary-converted RF signal received from the AGC/clamp circuit 103 and outputs a signal obtained as a result of the process to a Viterbi decoder 105. The binary-converted RF signal completing the equalizing process is supplied to a PLL circuit employed in the equalizer/PLL circuit 104 to generate a clock signal CLK synchronized with the binary-converted RF signal, that is, an RLL (1, 7) code series.

The frequency of the clock signal CLK represents the actual rotational speed of the disc 51. A CLV processor 111 compares the clock signal CLK received from the equalizer/PLL circuit 104 with a reference value representing a predetermined CLV speed included in the table shown in FIG. 3 to result in a difference, and uses the difference as a signal component for generating a spindle-error signal SPE. The clock signal CLK is also used as a clock signal in processing carried out by a necessary signal processing circuit system including mainly an RLL (1, 7) demodulation circuit 106 for example.

The Viterbi decoder 105 decodes the binary-converted RF signal received from the equalizer/PLL circuit 104 in accordance with the so-called Viterbi decoding method to generate an RLL (1, 7) code series as playback data.

The playback data is supplied to an RLL (1, 7) demodulation circuit 106 for carrying out (1, 7) demodulation to produce a data stream.

The data stream obtained as a result of the demodulation carried out by the RLL (1, 7) demodulation circuit 106 is stored into a buffer memory 42 by way of a data bus 114. The data stream is spread in the buffer memory 42.

First of all, the data stream spread in the buffer memory 42 in this way is subjected to error correction processing carried out by an EDC processing circuit 116 in error-correction block units in accordance with the RS-PC technique. Then, the data stream is subjected to descramble processing and an EDC decoding process, which are carried out by a descramble/EDC-decoding circuit 117. The EDC decoding process is a process to detect an error.

Playback data DATAp is data completing the processes described so far. The playback data DATAp is typically transferred from the descramble/EDC-decoding circuit 117 to an audio compression encoder/decoder 122 at a transfer rate determined by a transfer clock signal generated by a transfer-clock-generating circuit 121.

The playback data DATAp is compressed audio data completing compression adopting the ATRAC2 technique. The audio compression encoder/decoder 122 decompresses the playback data DATAp supplied by the descramble/EDC-decoding circuit 117 by ad-option of the ATRAC2 technique. Typically, the playback data DATAp is converted into digital audio data with a sampling frequency of 44.1 KHz and 16 quantization bits. The digital audio data with a sampling frequency of 44.1 KHz and 16 quantization bits is transferred to an input/output processing unit 123.

The input/output processing unit 123 is a member for carrying out necessary signal processing and other processes related to operations to input and output audio signals. The digital audio data transferred from the audio compression encoder/decoder 122 to the input/output processing unit 123 as a playback output can be typically output with its format unchanged to a digital audio output terminal Dout. It should be noted that there may be provided a terminal and a signal route for outputting a digital audio signal completing compression as it is.

In addition, the digital audio data transferred from the audio compression encoder/decoder 122 to the input/output processing unit 123 can also be converted by a D/A converter employed in the input/output processing unit 123 into an analog audio signal to be output to an analog audio output terminal Aout. The analog audio signal output by the D/A converter can be further subjected to amplification suitable for audio outputs supplied to headphones by way of a headphone output terminal HPout.

The transfer-clock-generating circuit 121 is a circuit member for generating typically a crystal-system clock signal with a frequency required by functional circuit units employed in the recording/playback apparatus.

An optical current representing detected information read out by the optical head 53 from the disc 51 is also supplied to a matrix amplifier 107.

The matrix amplifier 107 carries out necessary processing on the detected information received from the optical head 53 to extract, among others, a tracking-error signal TE, a focus-error signal FE and groove information GFM, which are supplied to a servo circuit 45. The groove information is information on absolute addresses which is recorded as a wobbled groove WG. To be more specific, the tracking-error signal TE and the focus-error signal FE are supplied to a servo processor 112 whereas the groove information GFM is supplied to an ADIP band-pass filter 108.

The groove information GFM subjected to band limitation in the ADIP band-pass filter 108 is supplied to an A/B-track detection circuit 109, an ADIP decoder 110 and a CLV processor 111.

The A/B-track detection circuit 109 forms a judgment as to whether the track currently being traced is the track Tr.A or Tr.B from the groove information GFM received from the ADIP band-pass filter 108 by typically adoption of the technique described earlier by referring to FIG. 2B. A result of the judgment is supplied to a driver controller 46. The ADIP decoder 110 decodes the groove information GFM received from the ADIP band-pass filter 108 and extracts an ADIP signal representing information on absolute addresses on the disc 51, supplying the ADIP signal to the drive controller 46. The driver controller 46 executes necessary control based on the above track detection information and the ADIP signal.

The CLV processor 111 receives the clock signal CLK from the equalizer/PLL circuit 104 and groove information GFM from the matrix amplifier 107 through the ADIP band-pass filter 108. The CLV processor 111 generates a spindle error signal SPE for controlling a CLV servo and supplies the signal to a servo processor 112. The generation of the spindle error signal SPE is typically based on an error signal obtained as a result of groove information GFM's integration phase errors relative to the clock signal CLK. It should be noted that necessary operations to be carried out by the CLV processor 111 are controlled by the driver controller 46.

The servo processor 112 generates a variety of servo control signals such as a tracking control signal, a focus control signal, a thread control signal and a spindle control signal, supplying the signals to a servo driver 113. The generation of the servo control signals is based on the tracking-error signal TE, the focus-error signal FE, the spindle-error signal SPE as well as commands such as a tracking-jump error and an access command, which are issued by the driver controller 46.

The servo driver 113 generates servo drive signals based on the servo control signals received from the servo processor 112. The servo drive signals include two-wheel drive signals for driving a two-wheel mechanism, a thread-motor drive signal for driving a thread mechanism and a spindle-motor drive signal for driving the spindle motor 52. The two-wheel drive signals are two signals for driving the two-wheel mechanism in the focus and tracking direction respectively.

Such servo drive signals are supplied to a deck unit 5 for executing focus control and tracking control on the disc 51 and executing CLV control on the spindle motor 52.

As a recording audio source, typically, digital audio data having a predetermined format can be supplied to the input/output processing unit 123 by way of a digital-audio input terminal Din. In addition, an analog audio signal can be supplied through an analog-audio input terminal Ain.

The digital audio data supplied to the input/output processing unit 123 is subjected to a process to transform the sampling frequency and/or the number of quantization bits of the data if necessary. Eventually, digital audio data with a sampling frequency of 44.1 KHz and 16 quantization bits is supplied to the audio compression encoder/decoder 122.

An analog audio signal supplied to the input/output processing unit 123 is converted by an A/D converter employed in the input/output processing unit 123 into digital audio data which is then supplied to the audio compression encoder/decoder 122.

Digital audio data received by the audio compression encoder/decoder 122 from the input/output processing unit 123 is subjected to audio compression adopting the ATRAC2 technique to produce compressed audio data. The compressed audio data is then supplied to a scramble/EDC-encoding circuit 115 as user data DATAr to be recorded. The user recording data DATAr is supplied to the scramble/EDC-encoding circuit 115 typically in synchronization with a transfer clock signal generated by a transfer-clock-generating circuit 121.

In the scramble/EDC-encoding circuit 115, the user recording data DATAr is typically stored and spread in the buffer memory 42 to be subjected to data scramble processing and an EDC-encoding process. After completing these pieces of processing, the user recording data DATAr spread in the buffer memory 42 is subjected to a process to add error correction codes according to an RS-PC technique to the data DATAr in an ECC processing circuit 116.

The user recording data DATAr completing the processes carried out so far is read out from the buffer memory 42 and supplied to an RLL (1, 7) modulation circuit 118 through a data bus 114.

In the RLL (1, 7) modulation circuit 118, the user recording data DATAr supplied thereto is subjected to RLL (1, 7) modulation. The modulation produces an RLL (1, 7) code series as data to be recorded. The RLL (1, 7) code series is output to a magnetic-head-driving circuit 119.

By the way, in accordance with the MD-DATA2 format, the so-called laser strobe magnetic-field technique is adopted as a method for recording data onto a disc. The laser strobe magnetic-field technique is a recording technique whereby a magnetic field modulated by data being recorded is applied to the recording surface of a disc and a laser beam to be radiated to the disc is generated as pulses synchronously with the data being recorded.

With such a laser strobe magnetic-field technique, a process of forming edges of pits recorded on the disc does not depend on transient characteristics of things such as the inversion speed of the magnetic field but is determined by radiation timings of the laser pulses instead.

For this reason, in comparison with a simple magnetic-field modulation technique, for example, with the laser strobe magnetic-field technique, the number of jitters of a recording pit can be reduced substantially with ease. That is to say, the laser strobe magnetic-field technique is a method advantageous to efforts to increase the recording density. The simple magnetic-field technique is a recording method whereby a laser beam is radiated to a disc in a steady state and a magnetic field modulated by data being recorded is applied to the recording surface of the disc.

The magnetic-head-driving circuit 119 drives the magnetic head 54 to apply a magnetic field modulated by input data being recorded to the disc 51. The RLL (1, 7) modulation circuit 118 outputs a clock signal synchronized with the data being recorded to a laser driver 120. On the basis of the clock signal received from the RLL (1, 7) modulation circuit 118, the laser driver 120 drives a laser diode employed in the optical head 53 to radiate laser pulses to the disc 51 synchronously with the recording data generated by the magnetic head 54 as a magnetic field. The laser pulses radiated by the laser diode have a required laser power appropriate for recording. As described above, the media drive unit 4 employed in this embodiment carries out a recording operation by adoption of the laser-strobe magnetic-field modulation technique.

It should be noted that the recording/playback apparatus implemented by this embodiment can also be provided with a functional circuit unit for the MD-DATA1 format. Not shown in the figure, such a functional circuit unit is provided for giving compatibility with the MD-DATA1 format, that is, a capability of recording and playing back data onto and from a disc conforming to the MD-DATA1 format.

Provided on the main unit of the recording/playback apparatus for operating the apparatus, an operation unit 124 comprises a variety of operators. The operation unit 124 outputs information on operations carried out on the operators to a system controller 46. The drive controller 46 executes necessary control corresponding to the input information on an operation in order to drive the recording/playback apparatus to carry out processing according to the operation.

It should be noted that a remote controller can be employed as an operation means in place of the operation unit 124. Not shown in the figure, the remote controller transmits information on an operation carried out on the remote controller as an infrared ray or an electric wave by radio communication. In this case, the main unit is conceivably provided with a reception unit for receiving the radio signal transmitted by the remote controller, decodes the signal and transfers a decoded signal to the system controller 46.

A display unit 125 implemented typically by an LCD device is used for properly displaying necessary information in accordance with control executed by the drive controller 46. Examples of information displayed on the display unit 125 during a playback operation are a track being played back, the number and/or the name of a group or the like to be described later and a playback lapsing time.

Information of an R-TOC stored in a management area on the disc 51 as will be described later is once demodulated after being played back from the disc 51 and then stored into the buffer memory 42.

3: Operation Unit

Figure 5:
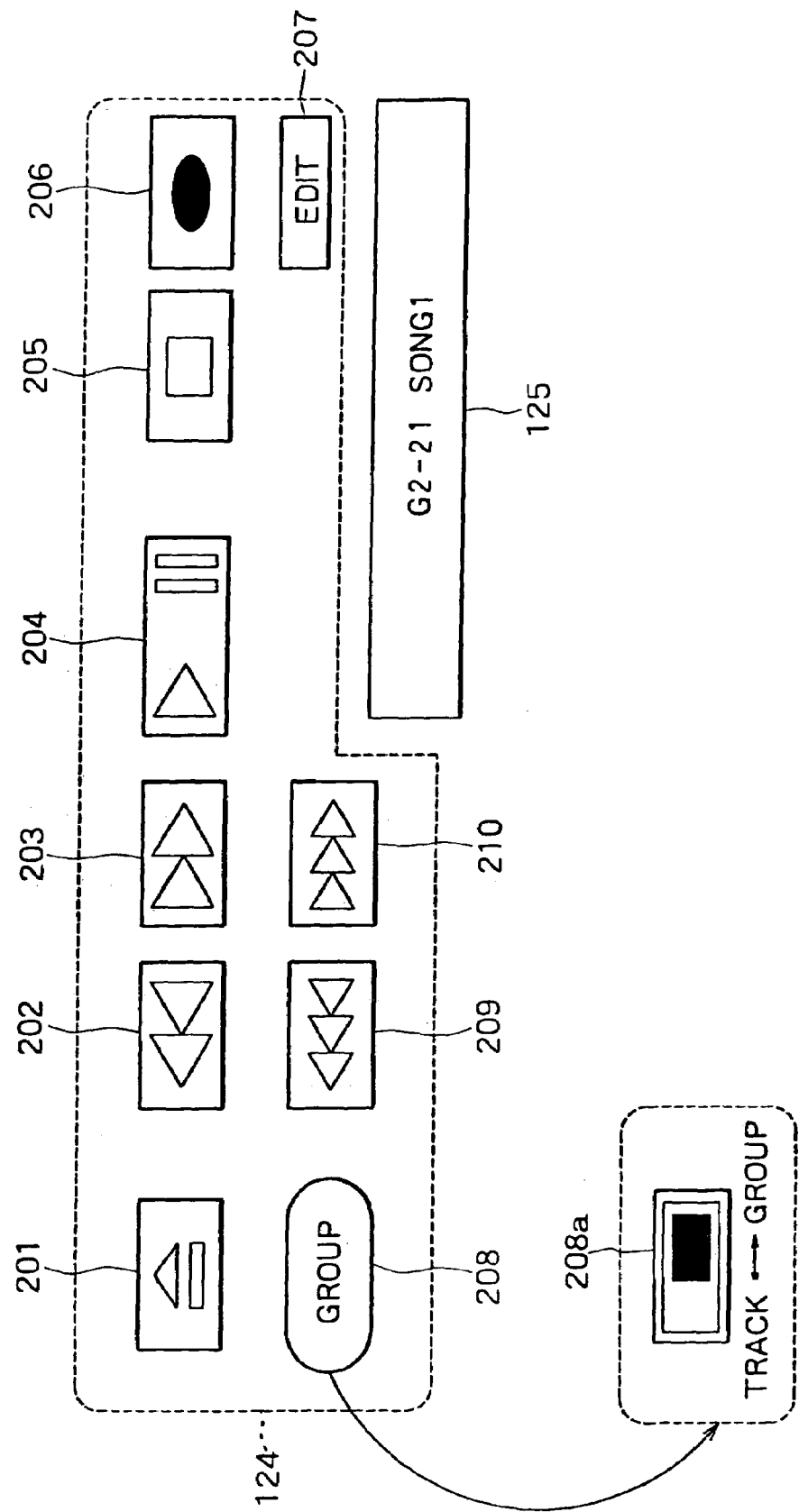
FIG. 5 is a block diagram showing a front panel comprising an operation unit and a display unit, which are employed in the recording/playback apparatus according to the present invention for a magneto-optical disc.

FIG. 5 is a diagram showing typical representative operators provided on the operation unit 124 employed in the recording/playback apparatus.

As shown in the figure, the operation unit 124 includes an eject key 201. The eject key 201 is an operator for ejecting a mini disc mounted on the recording/playback apparatus to the outside of the main unit.

Beginning search keys 202 and 203 are operators for searching the disc for the beginning of a track in the reserve and forward directions respectively.

A playback/pause key 204 is an operator for starting a playback operation and temporarily halting a playback operation. A halt key 205 is an operator for halting a recording or playback operation. A recording key 206 is an operator for starting an operation to record musical data.

An edit key 207 is an operator for carrying out a variety of editing operations. The editing operations include operations of moving a track, dividing a track, concatenating tracks and deleting a track. It should be noted that all pieces of music can also be erased. In addition, editing operations also allow the name of a track and the name of the disc to be entered and cataloged.

Furthermore, in this embodiment, a set unit comprising a plurality of tracks is treated as a group as will be described later. Recorded data is managed in such group units. In this case, the editing operations include operations of moving a group, dividing a group, concatenating groups, deleting a group and cataloging the name of a group.

A group recording mode key 208 is a key for switching the operating mode from a group recording mode to a track recording mode and vice versa. The group recording mode is a mode allowing recording and playback operations to be carried out in group units. On the other hand, the track recording mode is a mode allowing recording and playback operations to be carried out in track units as is the case with the conventional recording/playback apparatus.

For example, when the group recording mode key 208 is pressed once, the operating mode is switched from a group recording mode to a track recording mode. When the group recording mode key 208 is pressed again, the operating mode is switched back to the group recording mode from the track recording mode. As another possible implementation, when another operator is operated while the group recording mode key 208 is being pressed in the so-called compound operation, the group recording mode is set as the operating mode.

As another conceivable alternative, the group recording mode key is implemented as a group recording mode key 208a shown separately at the bottom of FIG. 5. The group recording mode key 208a is a mechanical slide switch. For example, when the group recording mode key 208a serving as a slide operator is sled to the right side, the group recording mode is set as the operating mode. When the group recording mode key 208a is sled to the left side, on the other hand, the track recording mode is set as the operating mode.

At any rate, the embodiment allows the operating mode to be switched from a group recording mode to a track recording mode and vice versa by carrying out a predetermined operation. Means for implementing this feature are not limited to that described by referring to FIG. 5.

In addition, the operation unit 124 shown in FIG. 5 also includes group beginning search keys 209 and 210. Each time the beginning search key 209 is pressed, for example, the disc 51 is searched in the reserve direction for the beginning of a group. Each time the beginning search key 210 is pressed, on the other hand, the disc is searched in the forward direction for the beginning of a group.

It should be noted that, as typical alternative operations, the group recording mode key 208 (208a) is operated to set a group recording mode. Then, the beginning search key 202 or 203 is operated to search the disc 51 for the beginning of a group. If this scheme is adopted, the group beginning search keys 209 and 210 can be eliminated.

Furthermore, the diagram of FIG. 5 also shows a display panel member serving as the display unit 125.

As shown in the figure, the display unit 125 displays a message saying "G2-21 SONG 1". G2 indicates a group number of 2 and 21 is the number of a track. SONG 1 is the name of the track even though it can be the name of a group.

4: Track Management

Figure 6A:
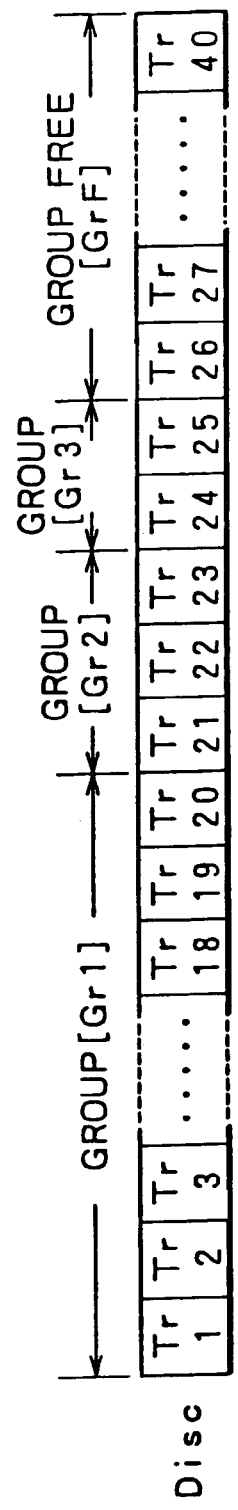
FIG. 6A is an explanatory diagram showing a model of a disc for recording grouped programs according to the present invention.
Figure 6B:
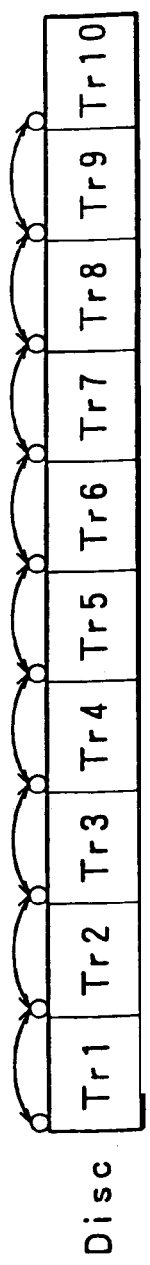
FIG. 6B is an explanatory diagram showing a model describing a track jump over the conventional disc.

In this embodiment, tracks recorded on a disc can be managed in group units each consisting of one or more tracks. FIGS. 6A and 6B are diagrams showing a comparison of the track management adopted by this embodiment with the conventional management of the tracks.

In particular, FIG. 6B shows management of data recorded in the conventional mini-disc system. That is to say, as is commonly known, in accordance with the conventional mini-disc format, recorded data is managed in track units only by using a U-TOC. In the case of the conventional mini disc, for example, assume that ten tracks Tr1 to Tr10 have been recorded on the disc. In this case, the U-TOC is used for managing these tracks.

Thus, in an operation to search for a beginning of data, the address of a next track is obtained from the U-TOC and an access to the address is made. Since the U-TOC is used for managing recorded data in track units, an operation is carried out to search for the beginning of a track as shown in the figure.

By the same token, since the U-TOC is used for managing recorded data in track units, an operation to record data, an operation to edit data and other operations are also basically carried out in track units.

In this embodiment, on the other hand, data recorded on a disc can be managed in a way shown in FIG. 6A.

The figure shows a case in which forty tracks Tr1 to Tr40 have been recorded. In this case, the tracks Tr1 to Tr20 are put in a group Gr1. That is to say, these tracks are managed as a single group.

The following four tracks Tr21 to Tr23 are put in a group Gr2 to be managed also as a single group. The following two tracks Tr24 and Tr25 are put in a group Gr3 to be managed also as a single group.

In this embodiment, a plurality of tracks identified by consecutive track numbers is managed as a single group as described above.

Such a group can be set by the user by typically carrying out a predetermined operation. In addition, as will be described later, in a dubbing-recording operation of an album comprising typically pieces of music recorded on a CD, a plurality of musical pieces (tracks) composing an album is managed as a single group and copied to the mini disc. In this case, the group consisting of the copied tracks is set automatically.

Even if a plurality of tracks can be managed for example as a group, however, it is not always necessary to put tracks recorded on the disc in one of groups in order to allow the user to utilize the tracks as the user wishes. As a matter of fact, there are of course conceivable cases in which it is desirable to put tracks in none of the groups.

Thus, in this embodiment, tracks that need not be put in a group are managed as group-free tracks as shown in FIG. 6A. In the example, the fifteen tracks Tr26 to Tr40 are managed as Gr.F (group-free) tracks.

Management of recorded data including such group units is implemented in the structure of management information (or the RTOC) also recorded on the same disc. It should be noted that the structure of the management information will be described later. In addition, a track can also be managed as a group even though such a particular case is not shown in the figure.

In addition, in this embodiment, by managing recorded data (or tracks) in group units as described above, operations to record, play back and edit data in group units are possible as will be described later.

5: Search for the Beginning in a Group Recording Mode

Figure 7:
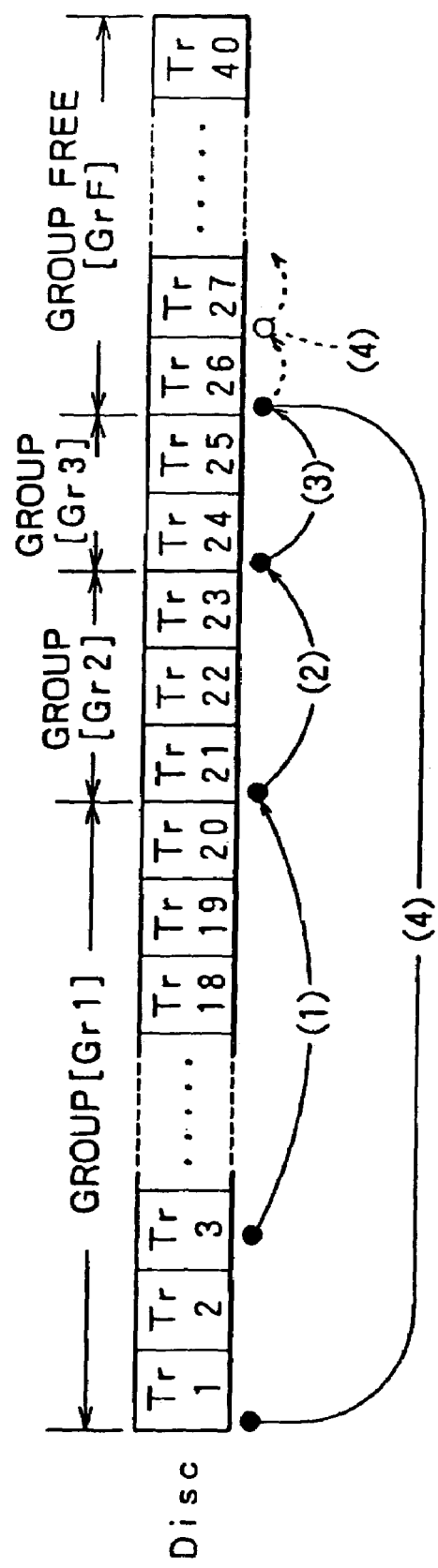
FIG. 7 is an explanatory diagram showing a track jump in an operation to search for a beginning in the forward direction in a group recording mode.

FIG. 7 is a diagram showing a model representing a typical operation to search for a beginning in a group recording mode.

The figure also shows a case in which forty tracks Tr1 to Tr40 have been recorded on a disc. A group Gr1 consists of the tracks Tr1 to Tr20, a group Gr2 consists of the tracks Tr21 to Tr23 and a group GR3 consists of the tracks Tr24 and Tr25. On the other hand, the tracks Tr26 to Tr40 are managed as Gr.F (group-free) tracks.

Assume that an operation to search for a beginning in the forward direction is carried out in a group recording mode while the track Tr3 pertaining to the group Gr1 is currently being played back.

In this case, an access is made to the beginning of the track Tr21, which is a track at the beginning of the group Gr2 following the group Gr1, as shown by an arrow (1) to start a playback operation. Let an operation to search for a beginning in the forward direction be carried out again further from this state. In this case, an access is made to the beginning of the track Tr24, which is a track at the beginning of the group Gr3 following the group Gr2, as shown by an arrow (2). In the example shown in the figure, the group Gr3 is the last one among groups on the disc.

Assume that an operation to search for a beginning in the forward direction is carried out again further from this state. In this case, an access is made to the beginning of the track Tr26, which is a first one among the group-free tracks, as shown by an arrow (3).

Let an operation to search for a beginning in the forward direction is carried out again in a group recording mode while any one of the group-free tracks is currently being played back. In this case, an access is made to the beginning of the first track Tr1 pertaining to the first group Gr1 as shown by a solid-line arrow (4).

It should be noted that the above operation to search for a beginning in the forward direction is carried out again in a group recording mode while any one of the Gr.F (group-free) tracks is currently being played back. A particular track is set as one of group-free tracks which do not pertain to any group in order to provide the user with convenience to use the particular track. Thus, there may be a conceivable case in which the user wants to make an access to a next track in the Gr.F group as indicated by a dashed-line arrow (4) even in the group recording mode.

Figure 8:
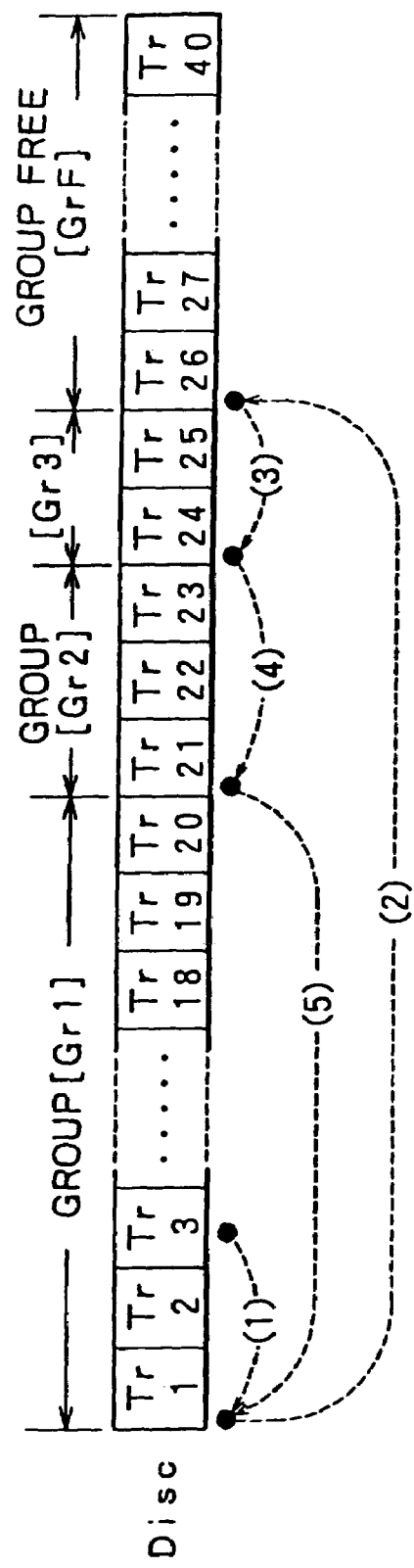
FIG. 8 is an explanatory diagram showing a track jump in an operation to search for a beginning in the reverse direction in a group recording mode.

FIG. 8 is a diagram showing operations each carried out in the group recording mode to search for a beginning in the reverse direction. It should be noted that tracks recorded on a disc shown in the figure and its group management are the same as those of the example shown in FIG. 6A.

Also in this example, assume that an operation to search for a beginning in the reverse direction is carried out while the track Tr3 pertaining to the group Gr1 is currently being played back. In this case, an access is made to the beginning of the track Tr1, which is a track at the beginning of the group Gr1, as shown by an arrow (1).

Let an operation to search for a beginning in the reserve direction be carried out again further from this state. In this case, an access is made to the beginning of the track Tr26, which is a first one among the Gr.F (group-free) tracks, as shown by an arrow (2).

Assume that an operation to search for a beginning in the reserve direction is carried out again further from this state. In this case, an access is made to the beginning of the track Tr24, which is the first tracks pertaining to the last group Gr3. Thereafter, operations to search for a beginning in the reserve direction are carried out sequentially again one operation after another in a group recording mode. As a result of the operations, accesses are made to the beginning of the first track Tr21 pertaining to the group Gr2 and the beginning of the first track Tr1 pertaining to the group Gr1.

It should be noted that, if an operation to search for a beginning in the reserve direction is carried out again while the first track Tr1 of the group Gr1 is being played back, an access is made to the last one among the group-free tracks. In possible subsequent processing, each time an operation to search for a beginning in the reserve direction is carried out while a group-free track is being played back, an access is made to a group-free track immediately preceding the group-free track being played back.

At any rate, the group-free tracks can be treated in a variety of possible ways during an operation to search for a beginning. Processing other than an access operation can also be carried out.

As described above, in this embodiment, an operation to search for a beginning can be carried out in group units each consisting of bundled tracks in accordance with an intention of the user. The feature of this embodiment is more effective for a case in which a large number of tracks can be recorded in a recording medium due to the fact that audio data is compressed by adoption of a technique with a high compression ratio and the fact that the recording medium now has a large storage capacity. That is to say, it is difficult to carry out an operation to search for the beginning of a group in track units wherein the composition of each group is determined by the user unless, for example, the user notes or memorizes a relation between tracks and groups. In addition, such an operation is cumbersome and not easy. In order to solve this problem, in this embodiment, accesses can be made sequentially with ease to beginnings of groups one group after another by carrying out ordinary operations to search for a beginning.

The aforementioned search for a beginning is a part of a typical playback operation carried out in group units. It should be noted, however, that a playback operation may include other sub-operations. For example, a disc playback apparatus is generally capable of carrying out special playback operations such as a repeat playback operation and a shuffle playback operation. In addition, it is possible to carry out a repeat playback operation for only a group and a shuffle playback operation for a track pertaining to a group. Furthermore, the user is allowed to carry out the so-called program playback operation in which an order to play back tracks can be determined arbitrarily. A program playback function also allows the user to set an order to play back groups.

6: Recording Operation 6-1: Group Recording Mode

Tracks recorded in a group recording mode are managed differently from tracks recorded in a track recording mode. The difference is described as follows.

A group recording mode is set by putting the group key 208a shown in FIG. 5 on the group side and then pressing the recording key 206.

Figure 9A:
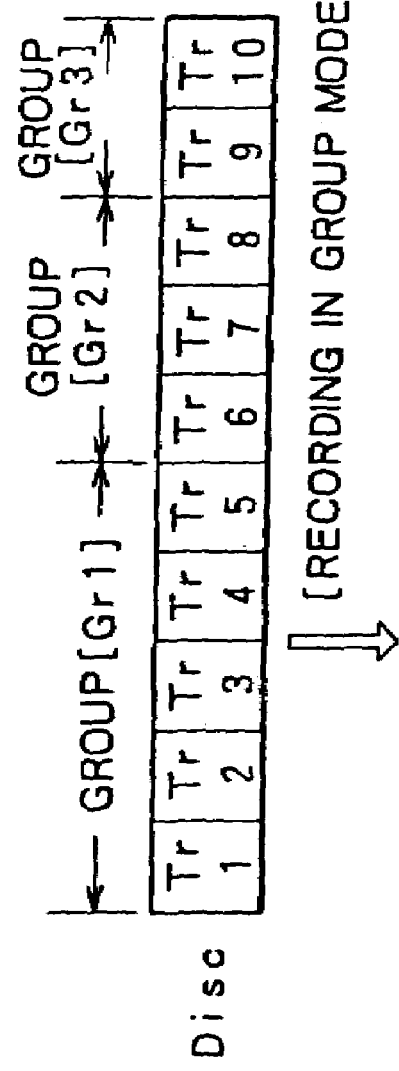
FIG. 9A is an explanatory diagram showing a model of a disc for recording grouped programs in an initial state.
Figure 9B:
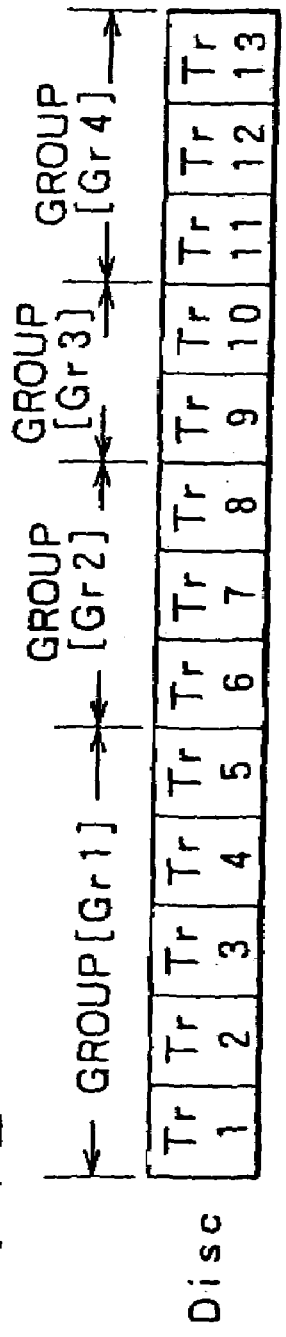
FIG. 9B is an explanatory diagram showing a model of the disc shown in FIG. 9A after an operation to record new programs in a group recording mode.

FIGS. 9A and 9B are diagrams showing tracks recorded in a group recording mode.

To be more specific, FIG. 9A shows a disc on which tracks Tr1 to Tr10 have been recorded. The tracks on the disc are managed by putting the tracks Tr1 to Tr5 in a group Gr1, the tracks Tr6 to Tr8 in a group Gr2 and the tracks Tr9 and Tr10 in a group Gr3.

Then, with a group recording mode set, a recording operation is carried out to add three tracks to the disc.

In this case, the added three tracks are managed as tracks Tr11, Tr12 and Tr13 which follow the track Tr10 as shown in FIG. 9B. These tracks Tr11, Tr12 and Tr13 are managed as a new group Gr4.

In this way, tracks recorded newly in a group recording mode are managed by putting the tracks in a new group.

6-2: Track Recording Mode

Figure 10A:
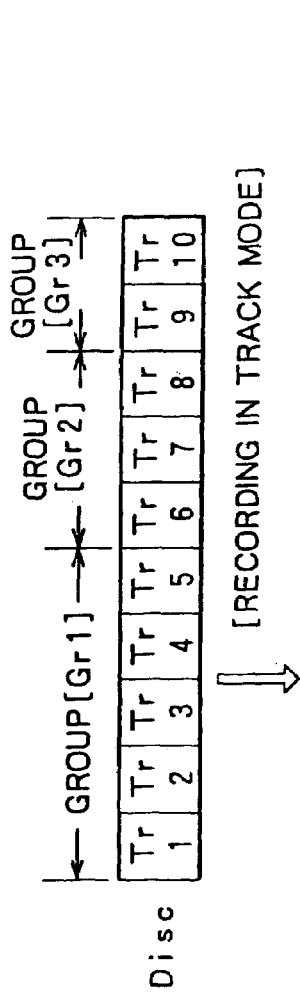
FIG. 10A is an explanatory diagram showing a model of a disc for recording grouped programs in an initial state.
Figure 10B:
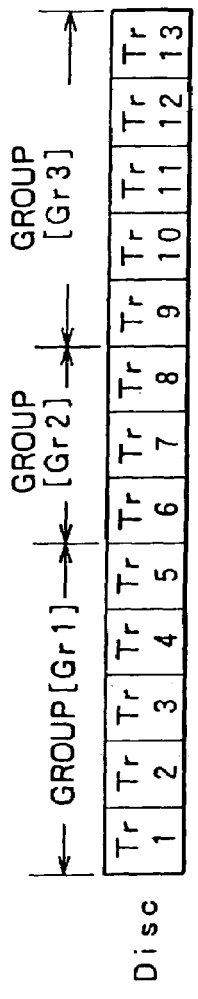
FIG. 10B is an explanatory diagram showing a model of the disc shown in FIG. 10A after an operation to record new programs into group 3 in a track recording mode.
Figure 10C:
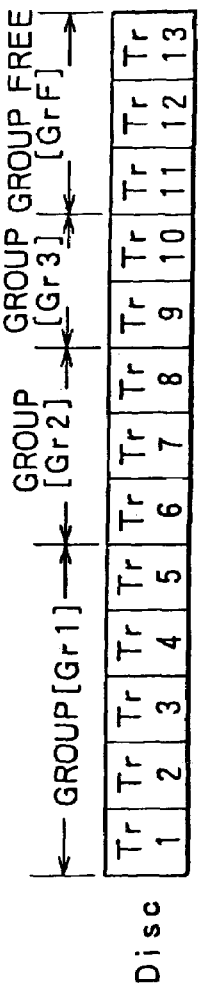
FIG. 10C is an explanatory diagram showing a model of the disc shown in FIG. 10A after an operation to add new programs in a track recording mode.

The following describes an operation to record additional tracks in a track recording mode by referring to FIGS. 10A to 10C.

FIG. 10A shows a disc on which the same tracks Tr1 to Tr10 as FIG. 9A have been recorded and are managed in the group recording mode. Also in this case, a recording operation is carried out to add three tracks to the disc.

Much like the example shown in FIG. 9, the added three tracks are managed as tracks Tr11, Tr12 and Tr13 which follow the track Tr10 as shown in FIG. 10B. In this case, however, these newly added tracks Tr11, Tr12 and Tr13 are managed by including them in the last group Gr3. That is to say, the added three tracks Tr11, Tr12 and Tr13 are included in the group Gr3 which consisted of only the tracks Tr9 and Tr10 prior to the recording operation to add the new track. The processing described above is carried out by specifying the group Gr3 by operation of the group key 208 and then specifying a track recording mode.

As a conceivable alternative, the same three tracks Tr11, Tr12 and Tr13 can be added in a recording operation to the disc shown in FIG. 10A to be managed in a way shown in FIG. 10C. That is to say, that the tracks Tr11, Tr12 and Tr13 are managed as group-free tracks.

A track recording mode is set by putting the group key 208a shown in FIG. 5 on the track side and then pressing the recording key 206.

7: Typical Editing in the Group Recording Mode

7-1: Moving

In this embodiment, playback and recording operations are carried out in a group recording mode as shown in FIGS. 7 to 9. In addition, by carrying out editing operations in the group recording mode, editing can be done in group units.

Figure 11A:
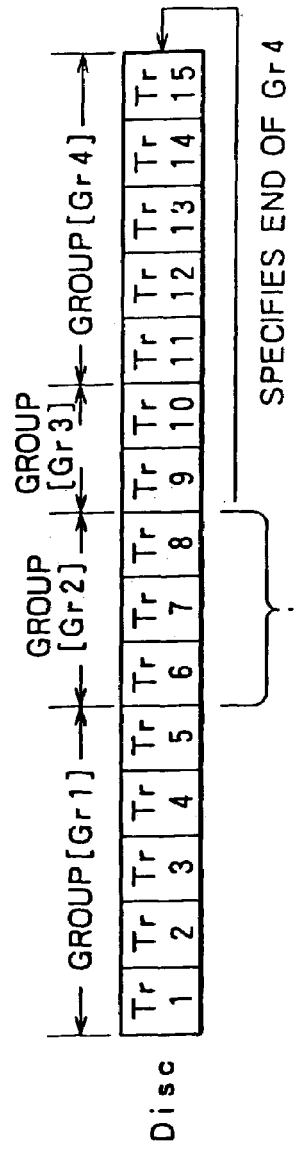
FIG. 11A is an explanatory diagram showing a model of a disc for recording grouped programs in an initial state.
Figure 11B:
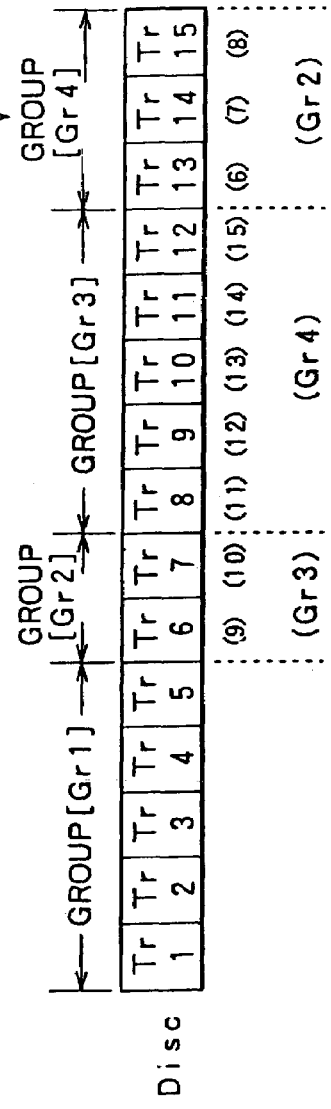
FIG. 11B is an explanatory diagram showing a model of the disc shown in FIG. 11A after an operation to move all programs pertaining to groups 2 through 4 in a group recording mode.

FIGS. 11A and 11B are diagrams showing a typical case in which move edit work is carried out in the group recording mode.

Assume a disc on which tracks have been recorded and are managed in group units as shown in FIG. 11A. As shown in FIG. 11A, tracks Tr1 to Tr15 have been recorded on the disc with the tracks Tr1 to Tr5 put in a group Gr1, the tracks Tr6 to Tr8 put in a group Gr2, the tracks Tr9 and Tr10 in a group Gr3 and the tracks Tr11 to Tr15 put in a group Gr4.

In the group recording mode, move operations in group units can be carried out. For example, the user is allowed to select a group to be moved among groups set on the disc as shown in FIG. 11A by carrying out a predetermined operation. Assume that the user specifies the group Gr2 consisting of the three tracks Tr6 to Tr8. Then, the user specifies a position behind the group Gr4 as a destination of the move and carries out an operation to confirm the specified destination and to execute the move. The group to be moved and the group serving as the destination of the move are specified by operating the operation keys 202 and 203 as well as the group key 208, which are shown in FIG. 5.

As a result, the state of management changes from that shown in FIG. 11A to that shown in FIG. 11B. It should be noted that a number enclosed in parentheses indicates the number of a track or the number of a group prior to the move editing work.

That is to say, the tracks Tr6, Tr7 and Tr8 which pertained to the group Gr2 are now the last three tracks Tr13, Tr14 and Tr15 as shown in FIG. 11B. The group consisting of the tracks Tr13, Tr14 and Tr15 now becomes the last group Gr4.

Also as a result of this move, the tracks which were managed as the tracks Tr9 to Tr15 are now managed as the tracks Tr6 to Tr12, that is, their track numbers are shifted ahead.

Speaking about group units, the former group Gr3 consisting of the former tracks Tr9 and Tr10 is now managed as a group Gr2 consisting of the tracks Tr6 and Tr7. By the same token, the former group Gr4 consisting of the former tracks Tr11 to Tr15 is now managed as a group Gr3 consisting of the tracks Tr8 to Tr12.

Assume for example that there is only a move edit function to move a track but no move edit function to move a group. In this case, in order to obtain the move-edit result shown in FIGS. 11A and 11B, first of all, the user needs to move the tracks Tr6, Tr7 and Tr8 shown in FIG. 11A track by track to respectively tracks Tr13, Tr14 and Tr15 shown in FIG. 11B. These operations are extremely cumbersome. The larger the number of tracks pertaining to a group, the more serious the problem.

In this embodiment, on the other hand, a plurality of tracks can be moved as a group in a batch operation. Thus, the problem described above is solved.

7-2: Concatenation

FIGS. 12A and 12B are diagrams showing typical concatenation editing work carried out in the group recording mode.

FIG. 12A shows a disc in the same recorded state as that shown in FIG. 11A. In this state, the user selects 2 groups with consecutive group numbers from the groups Gr1 to Gr4 shown in FIG. 12A. Assume that the users specifies the groups Gr3 and Gr4. Then, the user carries out an operation to perform the editing work.

As a result, the groups Gr3 and Gr4 shown in FIG. 12A are now bundled and managed as a single group as shown in FIG. 12B. A lower number of either the group Gr3 or the group Gr4, that is, the group number of three is assigned to the single group obtained as a result of bundling. Thus, three groups on the disc which are obtained as a result the concatenation editing work are the group GR1 consisting of the tracks Tr1 to Tr5, the group GR2 consisting of the tracks Tr6 and Tr7 and a new group Gr3 consisting of the tracks Tr9 to Tr15. The group Gr3 to be concatenated and the group Gr4 serving as the target of the concatenation are specified by operating the operation keys 202 and 203 as well as the group key 208, which are shown in FIG. 5.

It should be noted that, as is known so far, editing functions executed in track units include move, concatenation, deletion and division. In this embodiment, the editing work such as the deletion and the division can also be carried out in group units. To put it in detail without referring to a diagram, by specifying a group to be deleted by operating the operation keys 202 and 203 as well as the group key 208, the user is capable of deleting the specified group consisting of a plurality of tracks in a batch operation. The deletion editing work is carried out by typically specifying a track in a group or any arbitrary position in a track as a split position. The group is then divided into two portions at the split position.

In addition, in the conventional mini-disc system, a name can be cataloged for each disc and each track. That is to say, the name of a disc and the name of a track can be cataloged. When the disc is mounted on the disc drive, the name of the disc can be displayed. In addition, when the track is specified, the name of the track can be displayed.

Furthermore, in this embodiment, a plurality of tracks can be managed by putting them in a group. A name can be cataloged for each group by carrying out a predetermined editing operation. Moreover, when a group is specified or played back by carrying out a predetermined operation, the name of the group can be displayed on the display unit 125.

7-3: Dubbing Recording

In addition, in this embodiment, when audio data recorded on typically a CD is recorded onto a mini disc in a dubbing-recording operation, the audio data recorded onto the mini disc can be managed as follows.

Assume a mini disc on which five tracks Tr1 to Tr5 have been recorded as shown in FIG. 13A. Let data recorded on a CD shown in FIG. 13B and used as a dubbing source be dubbed in a dubbing-recording operation to the mini disc. In the CD shown in FIG. 13B, seven tracks Tr1 to Tr7 have been recorded. All these tracks Tr1 to Tr7 are dubbed onto the mini disc.

Contents of the mini disc after the dubbing operation are shown in FIG. 13C.

As shown in the figure, the tracks Tr1 to Tr7 dubbed from the CD are recorded at locations following the track Tr5 already existing on the mini disc. The newly recorded tracks Tr1 to Tr7 are managed as tracks Tr6 to Tr12. In this embodiment, the tracks Tr6 to Tr12 are managed by being included in a new group Gr2.

As described above, when data is dubbed from a dubbing source such as a CD, the dubbed tracks are managed automatically as a group. Thus, the user no longer needs to carry out work to bundle the tracks dubbed from the CD in a group by typically performing operations following the dubbing.

Since data recorded on a CD is typically the contents of an album, the user conceivably desires to treat the data dubbed from the CD like a group in many cases. Thus, by implementing the data management described above in a dubbing-recording operation, it is possible to provide the user with more convenience in using the mini disc. If a CD changer playback apparatus used for mounting a plurality of CDs and capable of selecting one of the CDs to be played back is used as a source of a dubbing-recording operation, for example, each time a CD is selected, the user needs to merely specify a group to which the CD is to be dubbed and is thus capable of benefiting from the convenience provided by the present invention.

8: Protected-Security Group

In addition, in this embodiment, security protection can be imposed for any group. An example is shown in FIG. 14A.

Figure 14A:
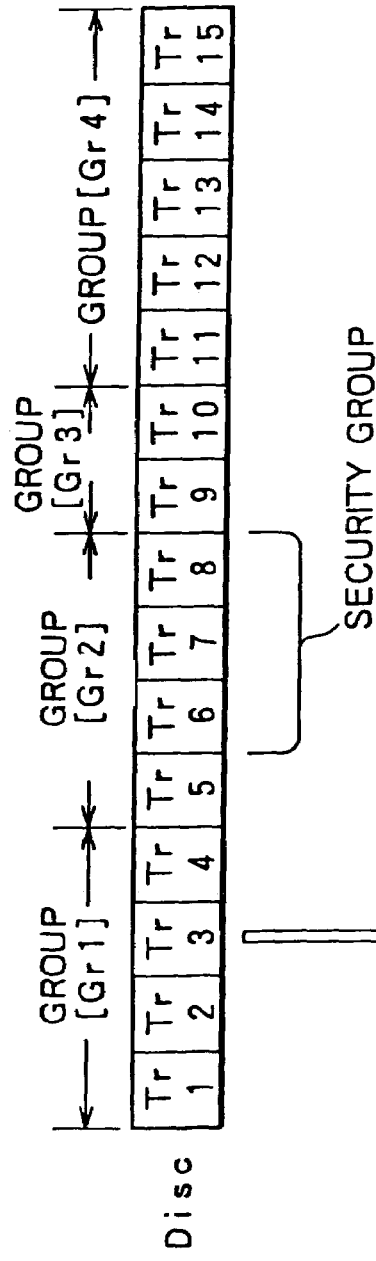
FIG. 14A is an explanatory diagram showing a model of a disc for recording grouped programs in an initial state.

FIG. 14A is a diagram showing a disc with the same recorded tracks as those shown in FIG. 11A. In this case, however, the group Gr2 is set as a protected-security group. A security protection can be set or removed by the user by typically carrying out a predetermined operation. Security protections are managed by using management information RTOC to be described later.

For example, unless the user enters a password by carrying out a predetermined operation, a security protection executes control to inhibit an operation to play back a track pertaining to a group set as a protected-security group on which the security protection is imposed even if a command to carry out the playback operation is issued.

Figure 14B:
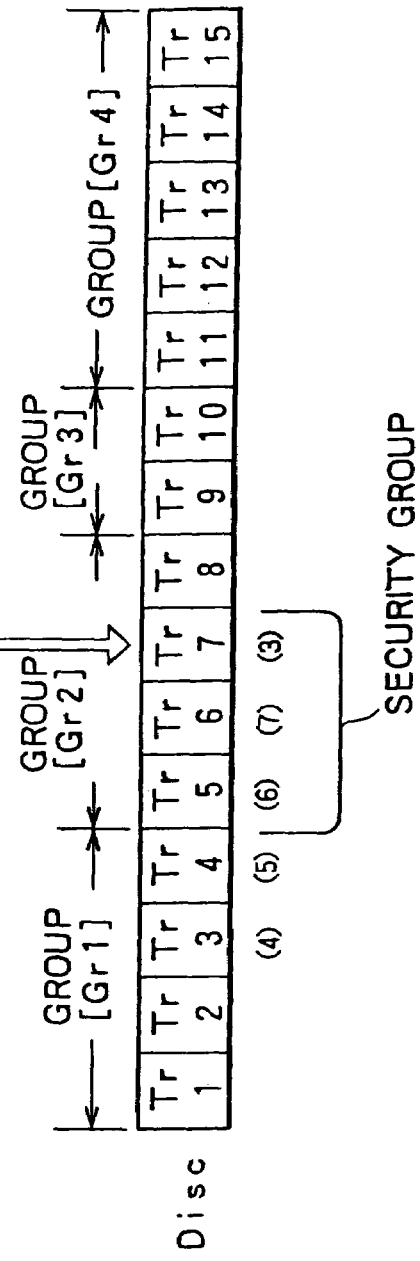
FIG. 14B is an explanatory diagram showing a model of the disc shown in FIG. 14A after an operation to move a third program pertaining to group 1 to group 2 in a group recording mode.

For example, assume that a track Tr3 pertaining to a group Gr1 other than the protected-security group Gr2 as shown in FIGS. 14A and 14B is moved to the protected-security group Gr2 as a track Tr7 by carrying out a move editing operation in a track recording mode.

As a result, the group originally containing 5 tracks Tr1 to Tr5 as shown in FIG. 14A changes to a new group Gr1 which now includes four tracks Tr1 to Tr4 as shown in FIG. 14B. The tracks Tr3 and Tr4 shown in FIG. 14B are the former tracks Tr4 and Tr5 shown in FIG. 14A.

The protected-security group Gr2 originally including three tracks Tr6, Tr7 and Tr8 as shown in FIG. 14A is now managed as a group which contains four tracks Tr5, Tr6, Tr7 and Tr8 as shown in FIG. 14B. The tracks Tr5 and Tr6 of the four tracks Tr5, Tr6, Tr7 and Tr8, which are shown in FIG. 14B, are former tracks Tr6 and Tr7.

The track Tr3 of the group Gr1 serving as a track to be moved and a track Tr7 of the group Gr2 serving as a track into which the track Tr3 is to be inserted are specified by operating the operation keys 202 and 203 as well as the group key 208, which are shown in FIG. 5.

As described above, when a track is moved to a protected-security group, security protection is imposed on the track automatically without specially requiring the user to carry out a setting operation after the move editing work. This track cannot be played back unless the user enters a password.

9: Typical TOC Structure 9-1: Disc Data Structure

A disc provided by this embodiment includes a recording area allocated to a PTOC and an RTOC, which serve as management information. When an operation to record or play back data onto or from the disc is carried out, information is read out from the PTOC and the RTOC. Then, the address of an area to which the data is to be recorded or the address of an area from which the data is to be read out is determined on the basis of management information read out from the PTOC and the RTOC.

When the disc is mounted, for example, the system controller 46 carries out an operation to play back data from the innermost circumference of the disc to read out management information, namely, the PTOC and the RTOC, from a predetermined area on the innermost circumference of the disc. The drive controller 46 writes the PTOC and the RTOC into the buffer memory 42, storing them therein. In this way, the PTOC and the RTOC can be referenced in an operation to record, play back or edit a program on or from the disc.

The RTOC can be updated in accordance with an operation to record program data and a variety of editing operations. In each recording or editing operation, the system controller 46 updates the RTOC by rewriting data into the RTOC stored in the buffer memory 42. At predetermined occasions, the RTOC stored in the buffer memory 42 is copied to the RTOC area on the disc with proper timings.

In implementation of a recording/playback and editing operation carried out in group units as described so far, necessary information in the RTOC is referenced or updated.

The following describes a typical structure of management information which can be used for implementing group management provided by this embodiment.

Figure 15A:
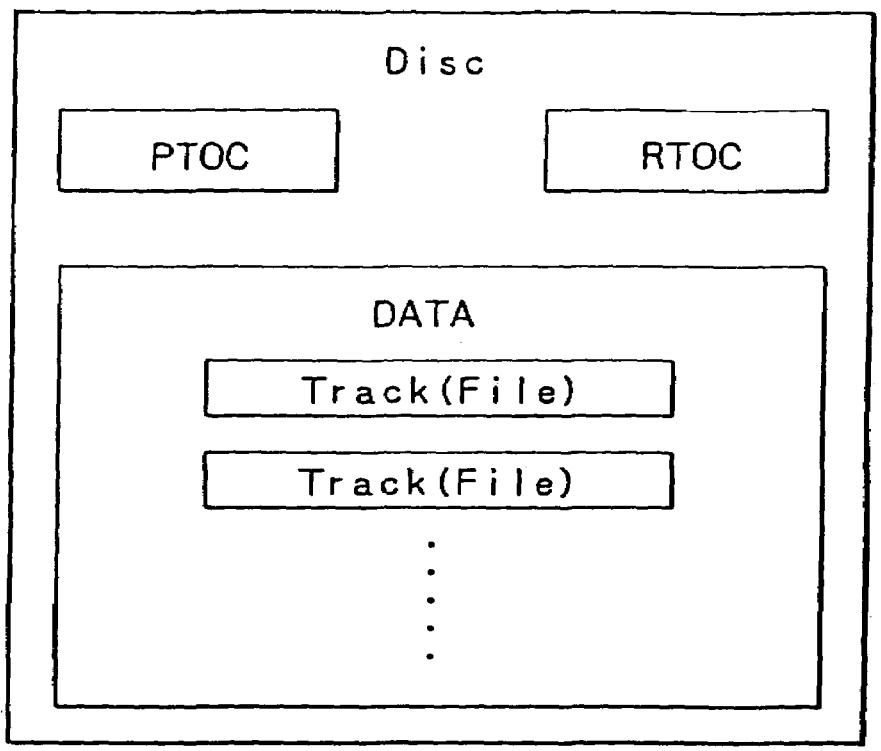
FIG. 15A is an explanatory diagram showing an implementation of group management on a disc.
Figure 15B:
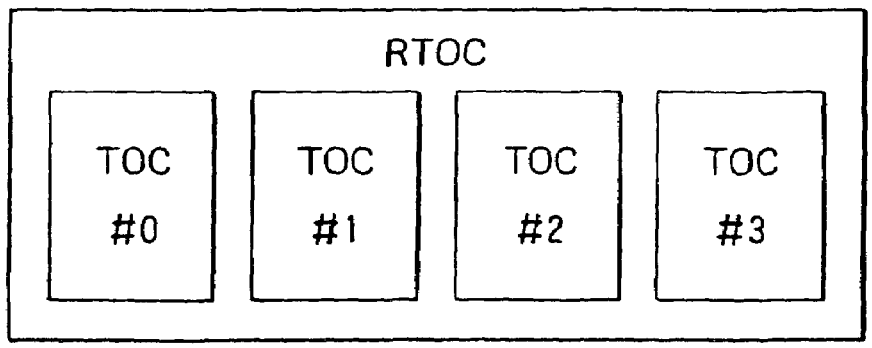
FIG. 15B is an explanatory diagram showing a typical structure of an RTOC for executing the group management shown in FIG. 15A.

Prior to the description of the structure of the management information provided by this embodiment, a typical structure of data recorded on the disc provided by this embodiment is described by referring to FIGS. 15A and 15B.

FIG. 15A is a diagram conceptually showing the structure of an entire disc provided by this embodiment. As shown in the figure, a PTOC and an RTOC are recorded on the disc as TOCs.

Located in a lead-in area on the innermost circumference of the disc, the PTOC is used for recording necessary management information as pits. The management information of the PTOC cannot be updated.

On the other hand, the RTOC is used for recording basic information necessary for management of data recorded on the disc. The RTOC is placed in a recordable area following the lead-in area on the innermost circumference. Thus, the information stored in this RTOC area can be updated. The information recorded in the RTOC is updated from time to time in accordance with results of operations to record data onto the disc and a variety of operations to edit tracks.

User data (DATA) is recorded into a recordable data area following the RTOC area in the recordable area in a format that can be managed in file units. It should be noted that, in this embodiment, the user data is managed in track units which each typically correspond to a musical unit. In addition, tracks can be managed in group units each comprising a plurality of tracks.

FIG. 15B is a diagram showing a model representing the RTOC. As shown in the figure, the RTOC comprises at least 4 tables, namely, TOC#0, TOC#1, TOC#2 and TOC#3. It should be noted that, in actuality, it is possible to provide an RTOC configuration wherein more tables are included so as to allow various kinds of management to be executed. In order to make the explanation easy to understand, however, only the four tables TOC#0, TOC#1, TOC#2 and TOC#3 are prescribed. The following describes configurations of the four tables TOC#0, TOC#1, TOC#2 and TOC#3.

9-2: TOC #0

Figure 16:
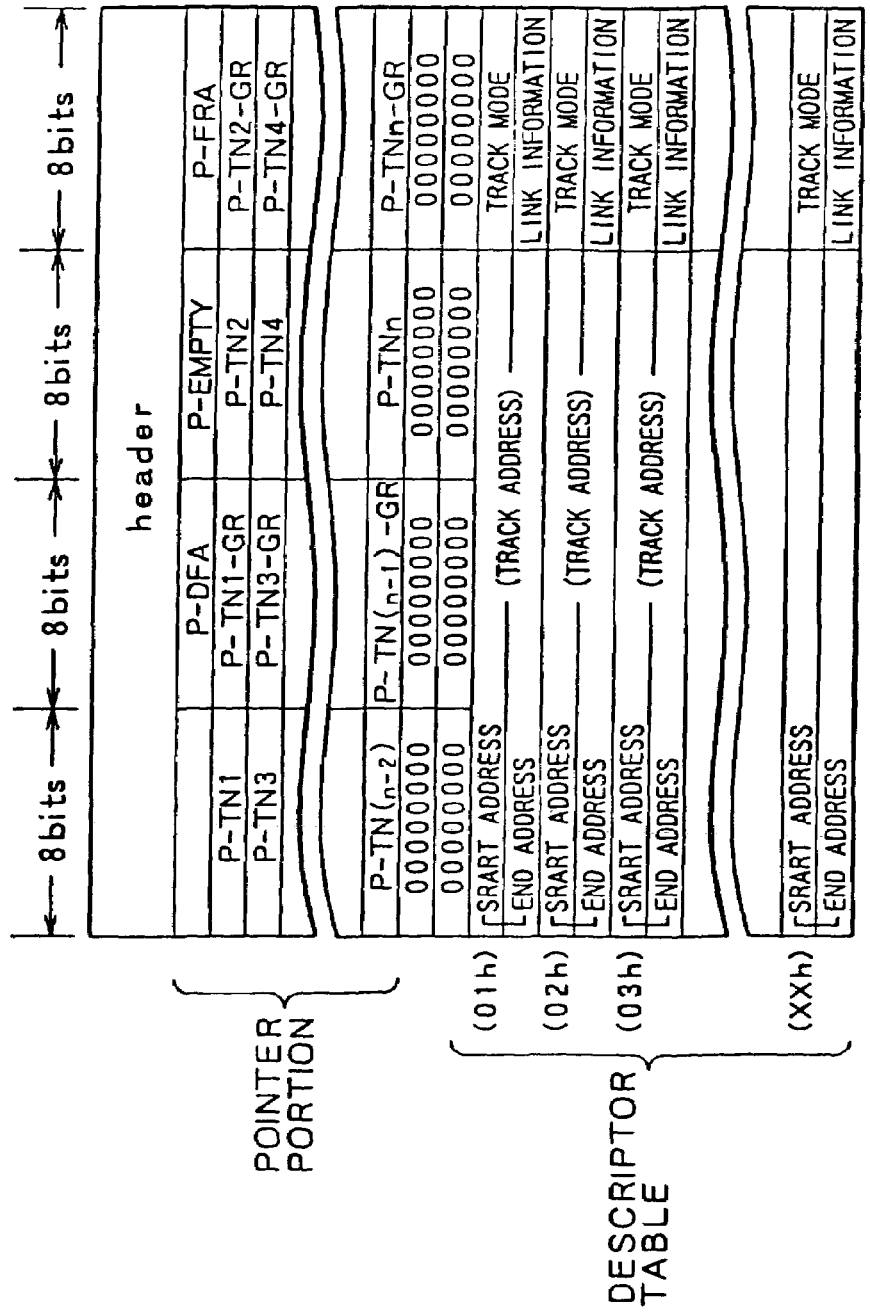
FIG. 16 is an explanatory diagram showing a typical data structure of an information-management table TOC#0 for managing recording locations of tracks.

FIG. 16 is a diagram showing a typical structure of the table TOC#0.

The table TOC#0 is used for recording information for managing mainly tracks (programs) such as pieces of music, which are recorded by the user, and free areas which can each be used for newly recording tracks.

In an operation to record a piece of music onto the disc, for example, a system controller 46 searches the table TOC#0 for a free area on the disc and then records the audio data of the piece of music onto the free area.

In an operation to play back a piece of music from the disc, on the other hand, the system controller 11 searches the table TOC#0 for the disc's area from which the piece of music is to be played back, and then makes an access to the area to play back the audio data of the piece of music from the area.

The table TOC#0 includes a header having a predetermined data size at the beginning thereof. The header is used for storing a variety of necessary management information such as typically a synchronization pattern and the address of the header.

The header is followed by a pointer portion and a descriptor table.

The pointer portion comprises a variety of pointers including P-DFA, P-EMPTY, P-FRA and P-TN1 to P-TNn. Each of the pointers points to one of descriptors in the descriptor table. As will be described later, the descriptors describe free areas and areas for recording tracks such as pieces of music which have been recorded by the user.

The descriptor table comprises a predetermined number of descriptors which are pointed to by the pointers P-DFA, P-EMPTY, P-FRA and P-TN1 to P-TNn. Numbers 01h to xxh are assigned to the descriptors. Associated with a part, each of the descriptors describe a start address indicating the beginning of the part, an end address indicating the end of the part and information on the mode (the track recording mode) of the part. The part associated with the descriptor may be linked to another part. In this case, the descriptor also includes information on a link to another descriptor describing the start address, the end address and information on the mode of the other part.

As described above, addresses described in a descriptor are the start address and the end address of one part or a plurality of parts composing a piece of music (or a track).

In the recording/playback apparatus of this type, even though data of a piece of music (that is, a track or a program) may be recorded at physically discontinuous locations, that is, in a plurality of discrete parts, it is possible to carry out a playback operation of reproducing the data by making accesses to the discrete parts without causing a problem. Thus, data such as a piece of music recorded by the user may be actually stored in a plurality of discrete parts in order to improve the efficiency of utilization of the recordable area.

Since such discrete parts are used for recording a piece of music, information on a link is provided in each of descriptors describing the parts. A particular descriptor's information on a link is a number in the range of 01h to xxh assigned to another descriptor to which the particular descriptor is linked.

As described above, each of the descriptors composing the descriptor table of the table TOC#0 represents a part. Assume that a piece of music is stored in three parts linked to each other. In this case, the locations of the parts are managed by using three descriptors which are used for describing the three parts respectively and linked to each other by pieces of information on a link.

The descriptors included in the descriptor table of the table TOC#0, which are identified by numbers 01h to xxh, are pointed to by the pointers P-DFA, P-EMPTY, P-FRA and P-TN1 to P-TNn to describe parts as follows.

The pointer P-DFA points to a descriptor for describing a defective area on the magneto-optical disc. A defective area is an area defective due to an injury or the like. A defective area is a track portion (a part) or a plurality of track portions (a plurality of parts). The part of the defective area is described by the descriptor pointed to by the pointer P-DFA. In the case of a defective area comprising a plurality of parts described by respectively the same plurality of descriptors linked to each other by pieces of link information to form a linked list, the pointer P-DFA describes a descriptor at the head of the linked list of the descriptors. For example, if a defective area exists, the pointer P-DFA is set at a number in the range of 01h to xxh to point to one of the descriptors identified by the numbers 01h to xxh respectively. The descriptor pointed to by the pointer P-DFA describes the start and end addresses of a part of the defective area. If the defective area consists of a plurality of parts or if there is a plurality of defective areas consisting of a plurality of parts, the plurality of parts are described by the same plurality of descriptors linked to each other by pieces of link information to form a linked list. A descriptor at the end of the linked list includes link information set at a value of typically 00h to indicate that a part described by the last descriptor is the last part of the defective area or the defective areas.

The pointer P-EMPTY points to an unused descriptor in the descriptor table. To put it concretely, the pointer P-EMPTY is set at a number in the range 01h to xxh to point to an unused descriptor identified by the number. If a plurality of unused descriptors exists, the descriptors are linked to each other by pieces of link information to form a linked list in the descriptor table. In this case, the pointer P-EMPTY points to an unused descriptor at the beginning of the linked list.

The pointer P-FRA points to a descriptor for describing a free area on the magneto-optical disc. A free area is an area onto which data can be written. An area, from which data has been erased, is treated like a free area. A free area is a track portion (a part) or a plurality of track portions (a plurality of parts). The part of the free area is described by the descriptor pointed to by the pointer P-FRA. In the case of a free area comprising a plurality of parts described by respectively the same plurality of descriptors linked to each other by pieces of link information to form a linked list, the pointer P-FRA describes a descriptor at the head of the linked list of the descriptors. For example, if a free area exists, the pointer P-FRA is set at a number in the range of 01h to xxh to point to one of the descriptors identified by the numbers 01h to xxh respectively. The descriptor pointed to by the pointer P-FRA describes the start and end addresses of a part of the free area. If the free area consists of a plurality of parts or if there is a plurality of free areas consisting of a plurality of parts, the plurality of parts are described by the same plurality of descriptors linked to each other by pieces of link information to form a linked list. A descriptor at the end of the linked list includes link information set at a value of typically 00h to indicate that a part described by the last descriptor is the last part of the free area or the free areas.

Figure 20:
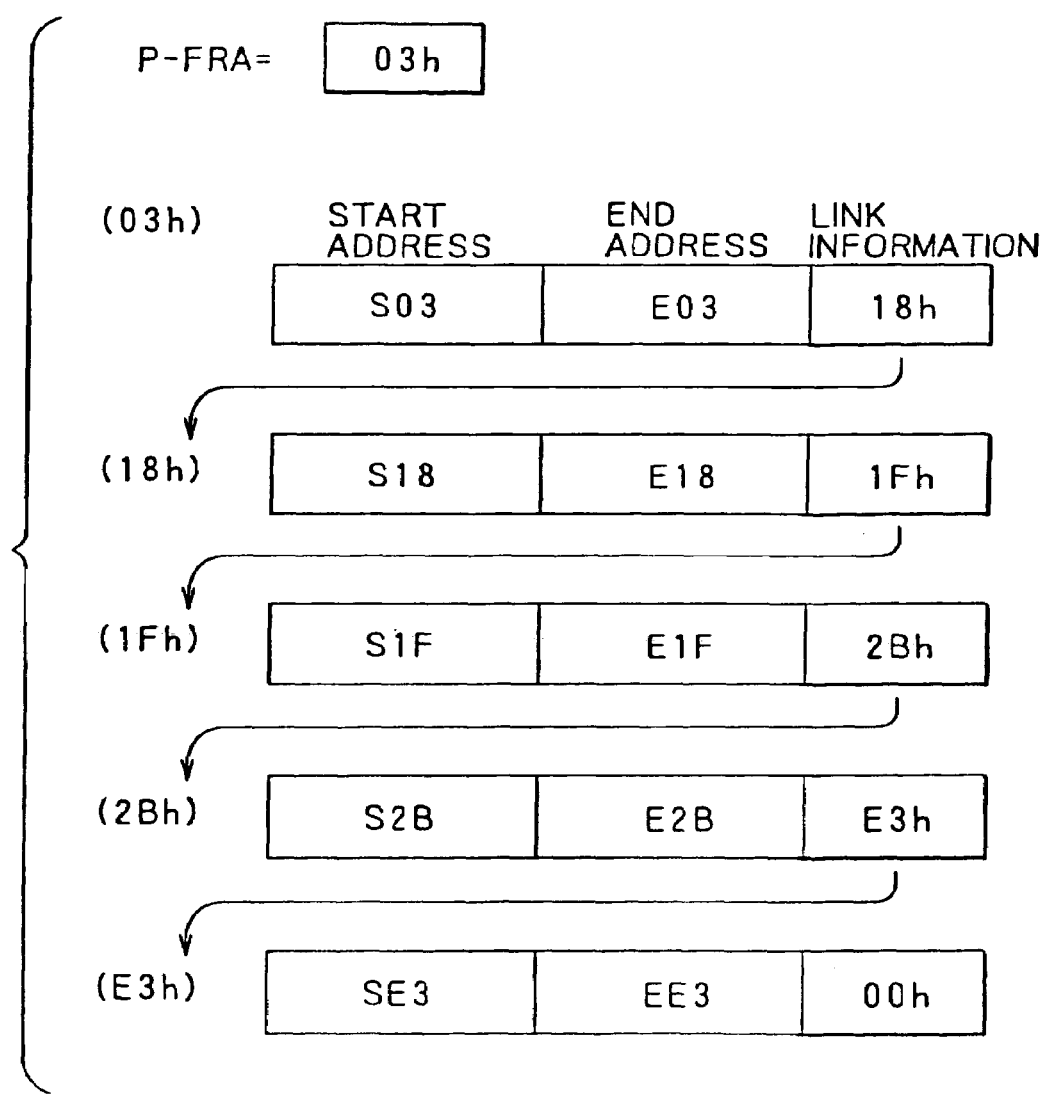
FIG. 20 is an explanatory diagram showing a model of link information for linking parts existing discretely on a disc.

FIG. 20 is a diagram showing a model representing a linked list of descriptors in the table TOC#0. The descriptors each describe a part of a free area. The descriptors on the linked list are identified by numbers 03h, 18h, 1Fh, 2Bh and E3h respectively. The pointer P-FRA is set at 03h to point to the descriptor at the beginning of the link list. Pieces of link information in the descriptors identified by numbers 03h, 18h, 1Fh, 2Bh and E3h are set at 18h, 1Fh, 2Bh, E3h and 00h respectively.

It should be noted that the linked list of descriptors each describing a part of a defective area has a configuration identical with that shown in FIG. 20.

Refer back to FIG. 16.

The pointer portion is prescribed to include the pointers P-TN1 to P-TNn and the pointers P-TN1-GR to P-TNn-GR. As shown in the figure, the pointer P-TN1 is followed by the pointer P-TN1-GR and the pointer P-TN2 is followed by the pointer P-TN2-GR. That is to say, the pointer P-TNx and the pointer P-TNx-GR having the same number x form a pair.

The pointer P-TNx points to a descriptor describing the magneto-optical disc's part used by the user for recording a track such as a piece of music. For example, the pointer P-TN1 points to a descriptor describing a part used for recording a track Tr1 (a first program). If the track Tr1 occupies a plurality of parts, the pointer P-TN1 points to a descriptor describing the earliest part.

If the track Tr1 is not a split track, that is, occupies only a part, on the other hand, the descriptor pointed to by the pointer P-TN1 describes the start and end addresses of the part.

Assume that a track Tr2 or a second program of a piece of music is recorded in a plurality of discrete parts on the disc. In this case, the time-axis order of the parts occupied by the track Tr2 is specified. To put it in detail, the pointer P-TN2 points to a descriptor describing the earliest part. The descriptor includes information on a link to the next descriptor describing a part immediately following the earliest part on the time axis. This linking is continued till a descriptor describing the last part. The descriptor describing the last part includes link information of 00h. The descriptors linked to each other form a linked list with the format shown in FIG. 20.

By specifying the order of all parts for recording data of the second piece of music in this way, in an operation to play back or update the second piece of music, the data of the table TOC#2 is used to drive the optical head 53 and the magnetic head 54 to make accesses to the discrete parts to carry out a continuous operation. By splitting a program into such discrete parts, the recording area can be used with a high degree of efficiency.

The pointer P-TNx-GR is the number of a group to which a track identified by the track number x pertains. For example, the pointer P-TN1-GR following the pointer P-TN1 is set at 1. In this case, the number of a group to which a track identified by the track number 1 pertains is 1. That is to say, the track Tr1 pertains to a group with a group number of 1.

It should be noted that if a track Trx is treated as a group-free track, the pointer P-TNx-GR following the pointer P-TNx pointing to a descriptor describing a part for the track Trx is set typically at all 0 s or 00h.

With such a structure, recording and playback management can be carried out in track units by referring to the table TOC#0. It is also possible to determine which group a track pertains to or whether or not a track is a group-free track. For example, such information on a group can be used in an operation to display a message indicating which group includes a track currently being played back on the display unit 125.

9-3: TOC#1

Figure 17:
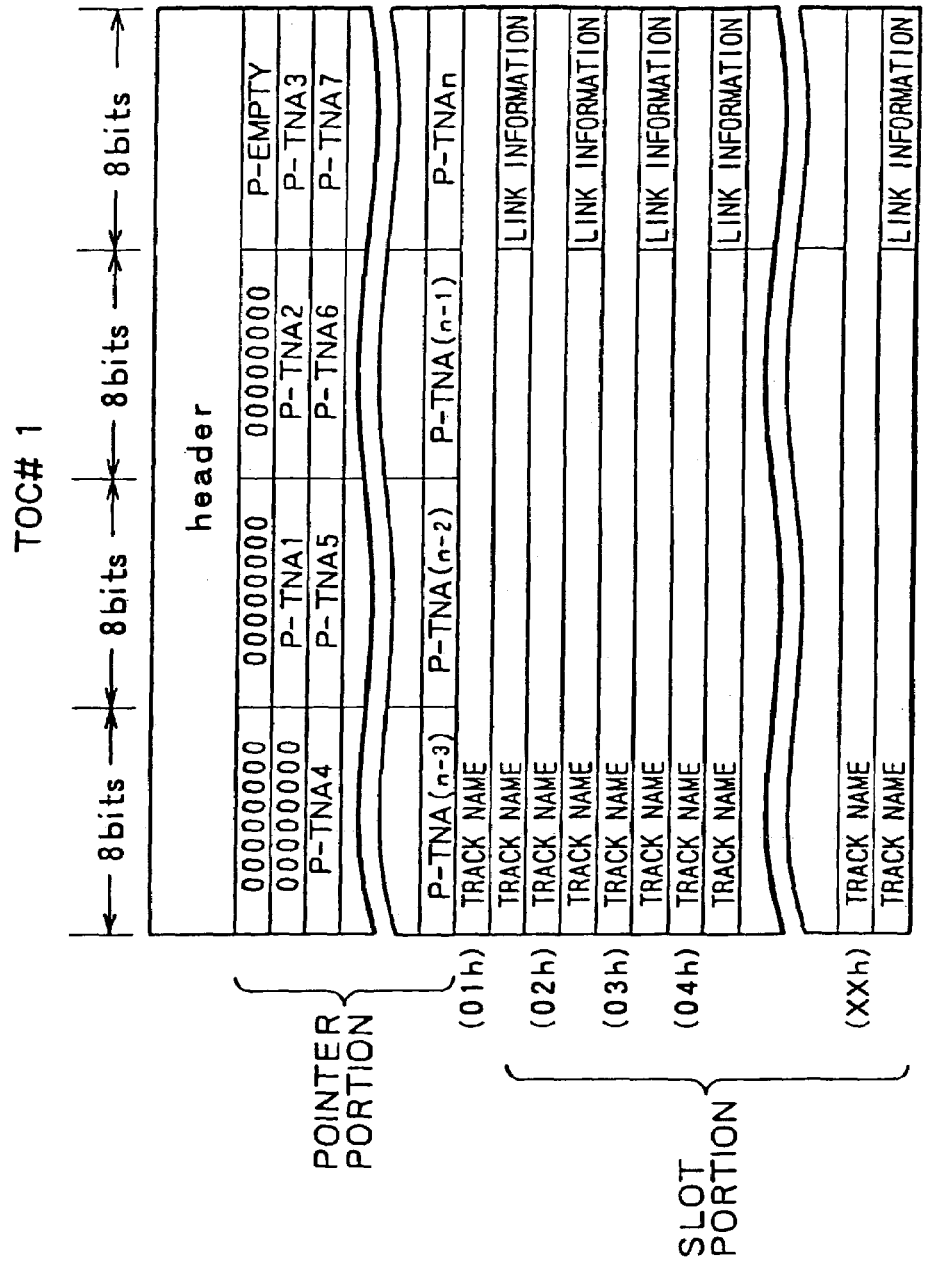
FIG. 17 is an explanatory diagram showing a typical data structure of an information-management table TOC#1 for managing track names.

FIG. 17 is a diagram showing a typical structure of the table TOC#1. The table TOC#1 includes a slot portion for cataloging the names of recorded tracks. A slot portion is a recording area for recording pieces of character information each representing the name of a track.

The table TOC#1 includes a header at the beginning. The header is followed by a pointer portion and the slot portion.

The pointer portion of the table TOC#1 is provided for recorded tracks. To be more specific, the pointer portion includes pointers P-TNA1 to P-TNAn each pointing to a slot in the slot portion. Each slot in the slot portion is used for storing the name of a recorded track associated with one of the pointers P-TNA1 to P-TNAn. Each slot identified by a number in the range of 01h to xxh is eight bytes in length. Having about the same structure as the table TOC#0, the table TOC#1 is used for management of character data.

Slots 01h to xxh are each used for recording character information representing the name of a track in terms of ASCII codes.

For example, a slot pointed to by the pointer P-TNA1 is used for storing the name of a track Tr1. The name of a track Tr1 is characters entered by the user. A track name exceeding seven bytes or seven characters is stored in two or more slots which are linked to each other by using pieces of link information. The pointer P-EMPTY points to an unused slot or the first one of unused slots in the table TOC#1.

9-4: TOC#2

Figure 18:
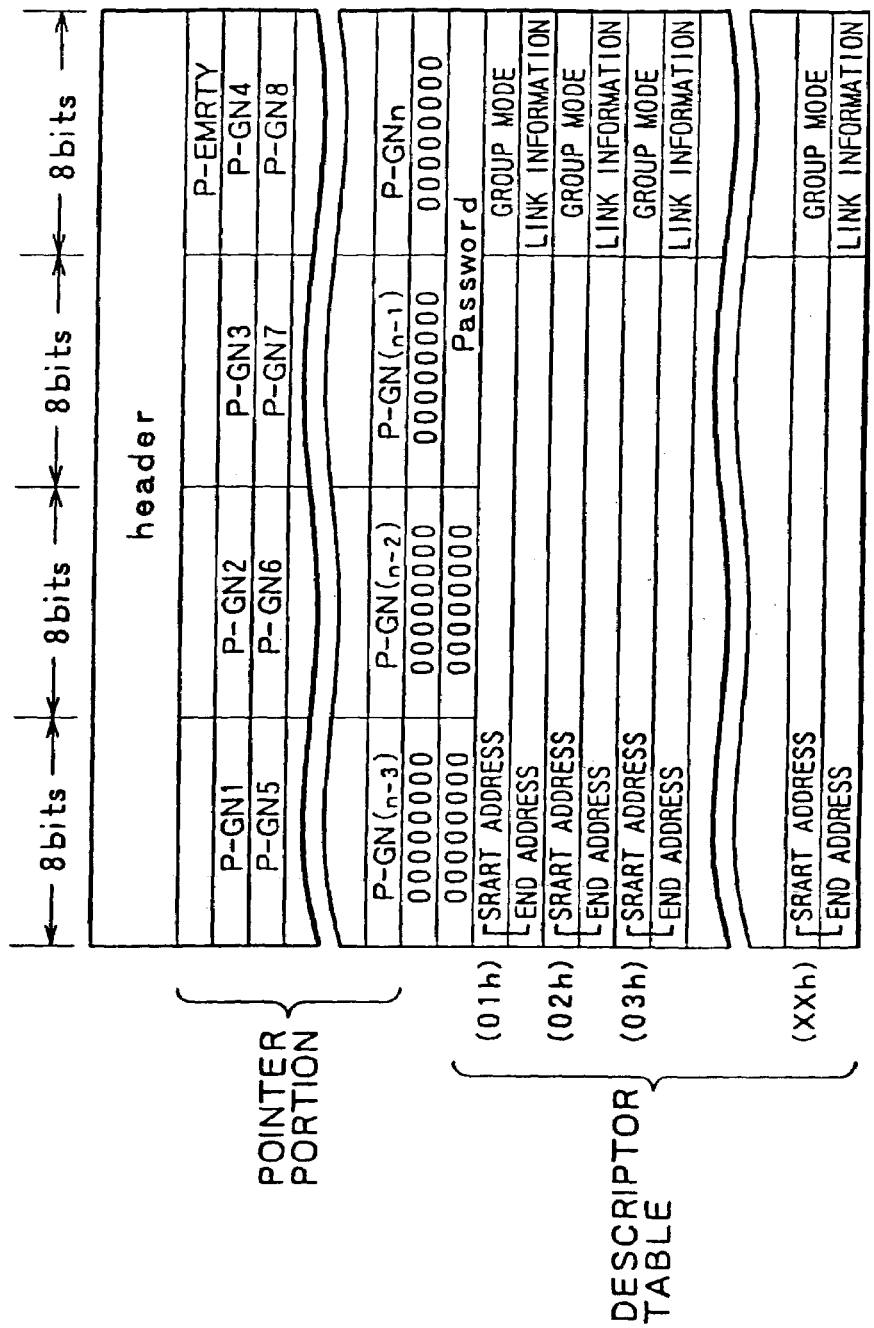
FIG. 18 is an explanatory diagram showing a typical data structure of an information-management table TOC#2 for managing recording locations of groups.

FIG. 18 is a diagram showing a typical structure of the table TOC#2.

The table TOC#0 described earlier is basically used for managing recorded data in track units and used for indicating a group to which each track pertains and indicating that a track is a group-free track.

The table TOC#2 includes pointers P-TNx for management similar to that of the table TOC#0. However, the table TOC#2 is used for managing parts on the disc in group units.

The structure of the entire TOC#2 includes a header having a predetermined size. The header is followed by a pointer portion and a descriptor table.

The pointer portion includes pointers P-EMPTY and P-GN1 to P-GNn each pointing to a descriptor in the descriptor table.

Each of the pointers P-GN1 to P-GNn associated with a group points to a descriptor describing a part occupied by the group. If the group occupies a plurality of parts, the descriptor pointed to by the pointer associated with the group describes the earliest one of the parts.

For example, the pointer P-GN1 is associated with the group Gr1. Assume that the group Gr1 consists of tracks including data recorded in non-discrete parts, that is, recorded in a single part on the disc. The pointer P-GN1 points to a descriptor describing the start and end addresses of the single part occupied by the group. To put it concretely, if the pointer P-GN1 is set at 01h, the descriptor 01h includes the start address of the first part included in the group Gr1 and the end address of the same part included in the group Gr1.

If the group Gr1 occupies a plurality of discrete parts, the time-axis order of parts occupied by the group Gr1 is specified. To put it in detail, the pointer P-GN1 points to a descriptor describing the earliest part. The descriptor includes information on a link to the next descriptor describing a part immediately following the earliest part on the time axis. This linking is continued till a descriptor describing the last part. The descriptor describing the last part includes link information of 00h.

The pointer P-EMPTY points to an unused descriptor or the first one of unused descriptors in the descriptor table.

An access to search for the beginning of a group described earlier by referring to FIGS. 7 and 8 can be made with ease by referring to the table TOC#2.

For example, when an operation to search for a beginning in the forward direction is carried once while the track Tr3 pertaining to the group Gr1 is being played back as shown by the arrow (1) in FIG. 7, the system controller 46 refers to the table TOC#2 stored in the buffer memory 42 to reference a descriptor pointed to by the pointer P-GN2. If the pointer P-GN2 is set at 02h, the descriptor 02h is referenced. Then, a start address is read out from the descriptor 02h and control is executed to make an access to the start address. In this case, the start address cataloged in the descriptor 02h is the start address of a first part of the group Gr2 shown in FIG. 7. Since the start address of the first part is the start address of the track Tr21, the system controller 46 makes an access to the start address of the track Tr21. That is to say, an access to the start address of the group Gr2 can be made. As a result, an operation to search for the beginning of a group is carried out in group units.

Each descriptor in the table TOC#2 includes an area for storing information related to the group recording mode. The group recording mode area is used for storing information whether or not a group to which a part described by the descriptor pertains is a security-protected group.

If the security protection shown in FIG. 14 is brought to effect for a group associated with the pointer P-GN2, a predetermined bit of the group recording mode information included in a descriptor pointed to by the pointer P-GN2 indicates that the group to which a part described by the descriptor pertains is a protected-security group. When the system controller 46 references this group recording mode information, the system controller 46 recognizes the group as a protected-security group and implements the limitations described earlier by referring to FIG. 14.

It should be noted that a password can be cataloged at a predetermined byte position in a margin area between the pointer portion and the descriptor table. Character information entered by the user by carrying out an operation is stored in this area as a password.

When a password is entered to remove security protection, the system controller 46 compares the entered password with the password stored in the table TOC#2. If the outcome of the comparison indicates that the passwords match each other, the security protection is removed and a playback operation is started in accordance with a request for an operation to play back the protected-security group. If the outcome of the comparison indicates that the passwords do not match each other, on the other hand, no control is executed to carry out a playback operation in spite of a request for an operation to play back the protected-security group.

9-5: TOC#3

Figure 19:
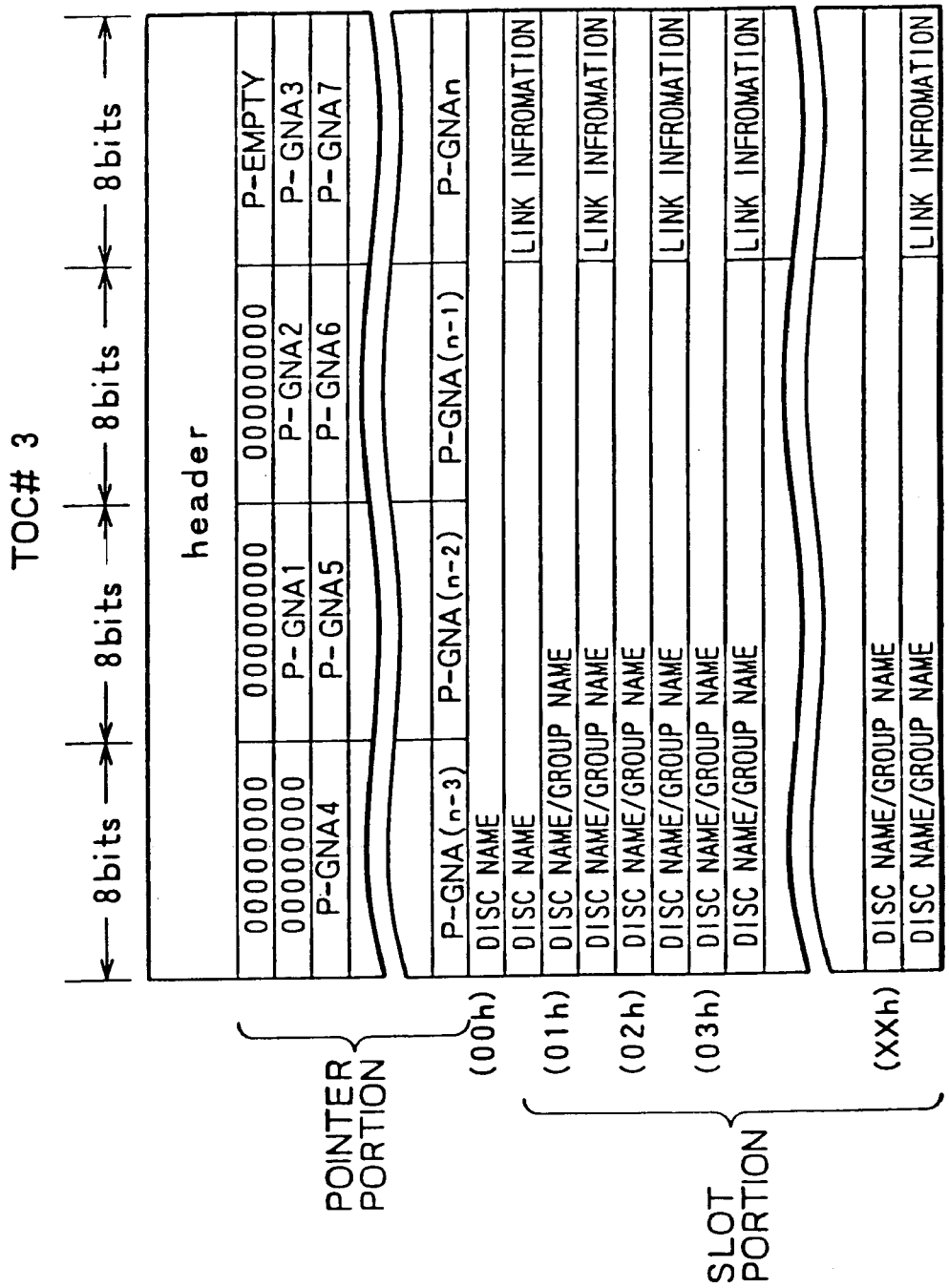
FIG. 19 is an explanatory diagram showing a typical data structure of an information-management table TOC#3 for managing the disc name/group names.

FIG. 19 is a diagram showing a typical structure of the table TOC#3.

The table TOC#3 has a data structure similar to the table TOC#1 described earlier except that the table TOC#3 is a data area for recording character information entered by the user as the name of a set group or the name of the disc itself.

The structure of the entire table TOC#3 also includes a header having a predetermined size. The header is followed by a pointer portion and a slot portion.

The pointer portion of the table TOC#3 includes a predetermined number of pointers P-GNA1 to P-GNAn each associated with a recorded track. The pointers P-GNA1 to P-GNAn each point to a slot in the slot portion. Each slot identified by a number in the range of 01h to xxh is eight bytes in length.

Slots 01h to xxh are each used for recording character information representing the name of the disc and the name of a group in terms of ASCII codes.

For example, a slot pointed to by the pointer P-GNA1 is used for storing the name of a group Gr1. The name of a group Gr1 is characters entered by the user. A group name exceeding seven bytes or seven characters is stored in two or more slots which are linked to each other by using pieces of link information.

It should be noted that the slot 00h is used as an 8-byte special area for storing the name of the disc. The slot is not pointed to by any of the pointers P-GNAx.

The pointer P-EMPTY points to an unused slot or the first one of unused slots in the table TOC#3.

FIG. 21 is a flowchart representing the procedure of an editing method according to the present invention. Much like the start of a playback operation, at the first step SP1 of the flowchart, an access is made to an R-TOC area located on an inner circumference of the disc to play back the tables TOC#0, TOC#1, TOC#2 and TOC#3 of the R-TOC.

At the next step SP2, the information of the R-TOC played back at the step SP1 is modulated by the Viterbi decoder 105 and the RLL (1, 7) demodulation circuit 106 before being stored in the buffer memory 42 through the data bus 114.

The flow of the procedure then goes on to a step SP3 to form a judgment as to whether or not an editing command has been issued by the user. Examples of the editing command are a group concatenation command, a group move command and a group deletion command. If an editing command has been issued by the user, the flow of the procedure goes on to a step SP4 to update the R-TOC, that is, the tables TOC#0, TOC#1, TOC#2 and TOC#3 stored in the buffer memory 42.

At the next step SP5, the updated R-TOC, that is, the updated tables TOC#0, TOC#1, TOC#2 and TOC#3 which are stored in the buffer memory 42, are recorded back into the R-TOC area located on an inner circumference of the disc.

In this embodiment, the RTOC comprising the tables TOC#0, TOC#1, TOC#2 and TOC#3 allows management of recorded data executed in group units in addition to track units used in the conventional management technique. Tracks are recorded in a track or group recording mode as shown in FIGS. 9, 10 and 13. Then, data of the RTOC is updated in accordance with results of the recording operation to allow the recorded data to be managed in group units as shown in the respective figures. By the same token, various kinds of editing work are carried out in group units as shown in FIGS. 11 and 12, and results of the editing work can also be managed in group units by updating data stored in the RTOC in accordance with the editing operations.

It should be noted that the present invention is by no means limited to configurations implemented by the embodiment as described above. Instead, a variety of changes and modifications can be made to the embodiment. For example, in addition to the formats shown in FIGS. 15 to 19 and used as a structure of the RTOC for managing data recorded in grouped tracks, it is also possible to adopt a folder concept in a directory structure using typically a file system.

In addition, in this embodiment, management of data is executed at the so-called two layers, namely, a track layer and a group layer where a group is a set of tracks. Management of data can also be conceivably executed at more than 2 layers. For example, the management of data can be executed at an even higher layer called a super-group layer where a super group is a set of groups.

Furthermore, apparatuses to which the present invention can be applied are not limited to the recording/playback apparatus for mini discs. For example, the present invention can also be applied to a recording/playback apparatus for other disc media. The present invention can even be applied to a recording/playback apparatus for media other than the disc media. An example of such other media is a flash memory.

Moreover, recorded data to which the present invention is applied is not limited to digital audio data. For example, the present invention can also be applied to video data obtained as a result of A/D conversion of a video signal.

While a preferred embodiment of the invention has been described using specific terms, such description is for illustrative purposes only, and it is to be understood that changes and variations may be made without departing from the spirit or scope of the following claims.

What is claimed is:

1. A recording/reproducing apparatus for recording a program on a recording medium having a program area for recording one or more programs and a management area for recording management information used for managing numbers of said programs in group units, each group unit obtained as a result of grouping predetermined programs selected from said programs recorded in said program area, said recording/reproducing apparatus comprising:
    playback means for playing back said management information from said management area on said recording medium;
    storage means for storing said management information reproduced by said playback means;
    operating means for designating first and second group units from a plurality of group units, by a user, and for selecting one of a plurality of recording modes including a group recording mode for recording at least one program in group units, and a program recording mode for recording the at least one program in program units;
    updating means for updating said management information stored in said storage means, in accordance with a designation by the user, by said operating means so as to combine programs included in the first group unit with programs included in the second group unit;
    recording means for recording said management information updated by said updating means into said management area on said recording medium,
    wherein said updating means includes at least means for concatenating at least one program included in the first group unit and at least one program included in the second group unit so as to manage the first group unit and the second group unit as a single group unit; and
    wherein said storage means includes means for storing said management information in at least two tables, including a first table that includes addresses and pointers for managing said programs in group units, and a second table that includes names of said group units entered by the user.

2. A recording/reproducing apparatus according to claim 1, wherein an edit command issued by said operating means selects a number of a group to be moved and a number of a group serving as the destination of the group to be moved.

3. A recording/reproducing apparatus according to claim 1, wherein an edit command issued by said operating means selects a program to be moved, specifies a first group including said selected program, specifies a second group serving as the destination of a move, and specifies an insertion position.

4. A recording/reproducing apparatus according to claim 1, further comprising means for selecting either a search operation to be carried out in said program units or a search operation to be carried out in said group units.

5. An editing method for editing data recorded on a recording medium comprising a program area for recording one or more programs and a management area for recording management information used for managing numbers of said programs in group units, each group unit obtained as a result of grouping predetermined programs selected from said programs recorded in said program area, said editing method comprising:
    playing back said management information from said management area on said recording medium;
    storing said management information played back at said playing step;
    selecting one of a plurality of recording modes including a group recording mode for recording at least one program in group units, and a program recording mode for recording the at least one program in program units;
    judging as to whether an editing command has been issued for a first group unit and a second group unit, each obtained as a result of grouping predetermined programs selected from said programs in said group recording mode;
    updating said management information stored at said storage step so as to combine one or more programs from the first group unit with programs included in the second group unit when an outcome of said judgment formed at said judging step indicates that an editing command has been issued for the first group unit and the second group unit; and
    recording said management information updated at said updating step into said management area on said recording medium,
    wherein said updating includes at least concatenating at least one program included in the first group unit and at least one program included in the second group unit so as to manage the first group unit and the second group unit as a single group unit; and
    wherein said storage step includes storing said management information in at least two tables, including a first table that includes addresses and pointers for managing said programs in group units, and a second table that includes names of said group units entered by the user.

6. An editing method according to claim 5, wherein said edit command selects a number of a group to be moved and a number of a group serving as the destination of the group to be moved.

7. An editing method according to claim 5, wherein said edit command concatenates a plurality of groups, each obtained as a result of grouping into a single group.

8. An editing method according to claim 5, wherein said edit command selects a program to be moved, specifies a first group including said selected program, specifies a second group serving as the destination of a move, and specifies an insertion position.

9. An editing method according to claim 5, further comprising:
    selecting either a search operation to be carried out in program units or a search operation to be carried out in group units.

10. A recording/reproducing apparatus for recording a program on a recording medium having a program area for recording one or more programs and a management area for recording management information used for managing numbers of said programs in group units, each group unit obtained as a result of grouping predetermined programs selected from said programs recorded in said program area, said recording/reproducing apparatus comprising:

a playback unit configured to reproduce said management information from said management area on said recording medium;

a buffer memory configured to store said management information reproduced by said playback unit;

an operation unit configured to designate first and second group units from a plurality of group units by a user and to select one of a plurality of recording modes including a group recording mode for recording at least one program in group units, and a program recording mode for recording the at least one program in program units;

a system controller configured to update said management information stored in said buffer memory, in accordance with a designation by the user, by said operation unit so as to combine programs included in the first group unit with programs included in the second group unit; and a recording unit configured to record said management information updated by said system controller into said management area on said recording medium, wherein said system controller updates said management information by at least concatenating at least one program included in the first group unit and at least one program included in the second group unit so as to manage the first group unit and the second group unit as a single group unit; and wherein said buffer memory is configured to store said management information in at least two tables, including a first table that includes addresses and pointers for managing said programs in group units, and a second table that includes names of said group units entered by the user.

11. A recording/reproducing apparatus according to claim 10, wherein an edit command issued by said operation unit selects a number of a group to be moved and a number of a group serving as the destination of the group to be moved.

12. A recording/reproducing apparatus according to claim 10, wherein an edit command issued by said operation unit selects a program to be moved, specifies a first group including said selected program, specifies a second group serving as the destination of a move, and specifies an insertion position.

13. A recording/reproducing apparatus according to claim 10, wherein the operation unit selects either a search operation to be carried out in said program units or a search operation to be carried out in said group units.

* * * * *